US011689105B2

(12) United States Patent
Krugly

(10) Patent No.: US 11,689,105 B2
(45) Date of Patent: Jun. 27, 2023

(54) METHOD AND APPARATUS FOR PWM CONTROL OF MULTI-MODE SWITCHING POWER SUPPLY USING ITERATIVE AVERAGE CURRENT MODE CONTROL

(71) Applicant: Microchip Technology Incorporated, Chandler, AZ (US)

(72) Inventor: Simon Krugly, San Jose, CA (US)

(73) Assignee: Microchip Technology Incorporated, Chandler, AZ (US)

( * ) Notice: Subject to any disclaimer, the term of this patent is extended or adjusted under 35 U.S.C. 154(b) by 92 days.

(21) Appl. No.: 17/381,827

(22) Filed: Jul. 21, 2021

(65) Prior Publication Data

US 2022/0345043 A1    Oct. 27, 2022

Related U.S. Application Data

(60) Provisional application No. 63/177,097, filed on Apr. 20, 2021.

(51) Int. Cl.
*H02M 3/158* (2006.01)
*H02M 1/00* (2006.01)

(52) U.S. Cl.
CPC ....... *H02M 3/1582* (2013.01); *H02M 1/0025* (2021.05)

(58) Field of Classification Search
CPC .................................................. H02M 1/0025
See application file for complete search history.

(56) References Cited

U.S. PATENT DOCUMENTS 8,358,117 B1    1/2013  Chui et al.
2010/0131219 A1    5/2010  Kenly et al.
(Continued)

FOREIGN PATENT DOCUMENTS

CN    111 342 536 A    6/2020

OTHER PUBLICATIONS

Su Chung-Cheng et al: "A Ripple-Based Adaptive On-Time Controlled Buck Converter With Slope Balance Technique", Analog Integrated Circuits and Signal Processing, Springer New York LLC, US, vol. 101, No. 3, Jun. 3, 2019, pp. 543-553, XP036931275, ISSN: 0925-1030, DOI: 10.1007/S10470-019-01471-5, Subsection 2.1 "2.1 Principle Of On-Time Control Buck Converter"; Subsection 2.3 "Proposed Slope Balance for Adaptive On-Time" figures 1-4.

(Continued)

*Primary Examiner* — Alex Torres-Rivera
(74) *Attorney, Agent, or Firm* — Burr & Forman LLP; Ryan M. Corbett

(57) ABSTRACT

A multi-mode converter using iterative average current mode pulse width modulation (PWM) control is provided. The converter may include a current sense amplifier configured to output a current sense signal over a present switching cycle based on an inductor current through an inductor, a voltage error amplifier configured to output an error voltage based on a difference between a reference voltage and an output voltage, and a PWM controller. The PWM controller may include an error voltage modifier circuit configured to selectively output the error voltage or a modified error voltage based on a mode signal, and an iterative average current control circuit configured to generate a PWM signal based on the output from the error voltage modifier circuit, the current sense signal over the present switching cycle and a current sense signal over a previous switching cycle that precedes the present switching cycle.

20 Claims, 18 Drawing Sheets

(56) References Cited

U.S. PATENT DOCUMENTS

| | | | |
|---|---|---|---|
| 2012/0119718 A1 | 5/2012 | Song | |
| 2012/0293144 A1* | 11/2012 | Chang | H02M 3/1588 323/271 |
| 2014/0002037 A1 | 1/2014 | Babazadeh et al. | |
| 2016/0079851 A1 | 3/2016 | Babazadeh et al. | |
| 2017/0222560 A1 | 8/2017 | Babazadeh | |
| 2021/0184559 A1* | 6/2021 | Tsai | H02M 1/083 |
| 2022/0149737 A1* | 5/2022 | Yang | H02M 3/1582 |

OTHER PUBLICATIONS

Search Report and Written Opinion of the International Searching Authority, European Patent Office, dated Jan. 14, 2022, International Application No. PCT/US2021/046885.

\* cited by examiner

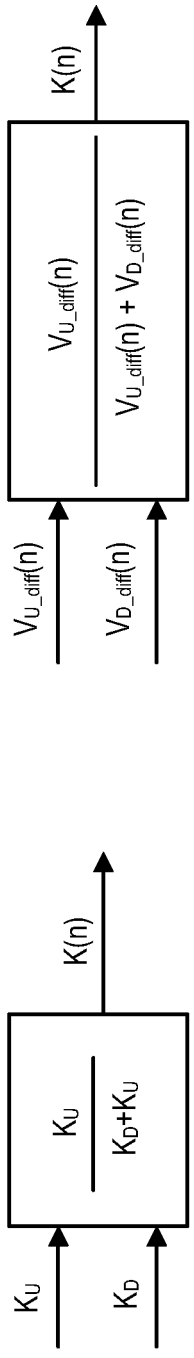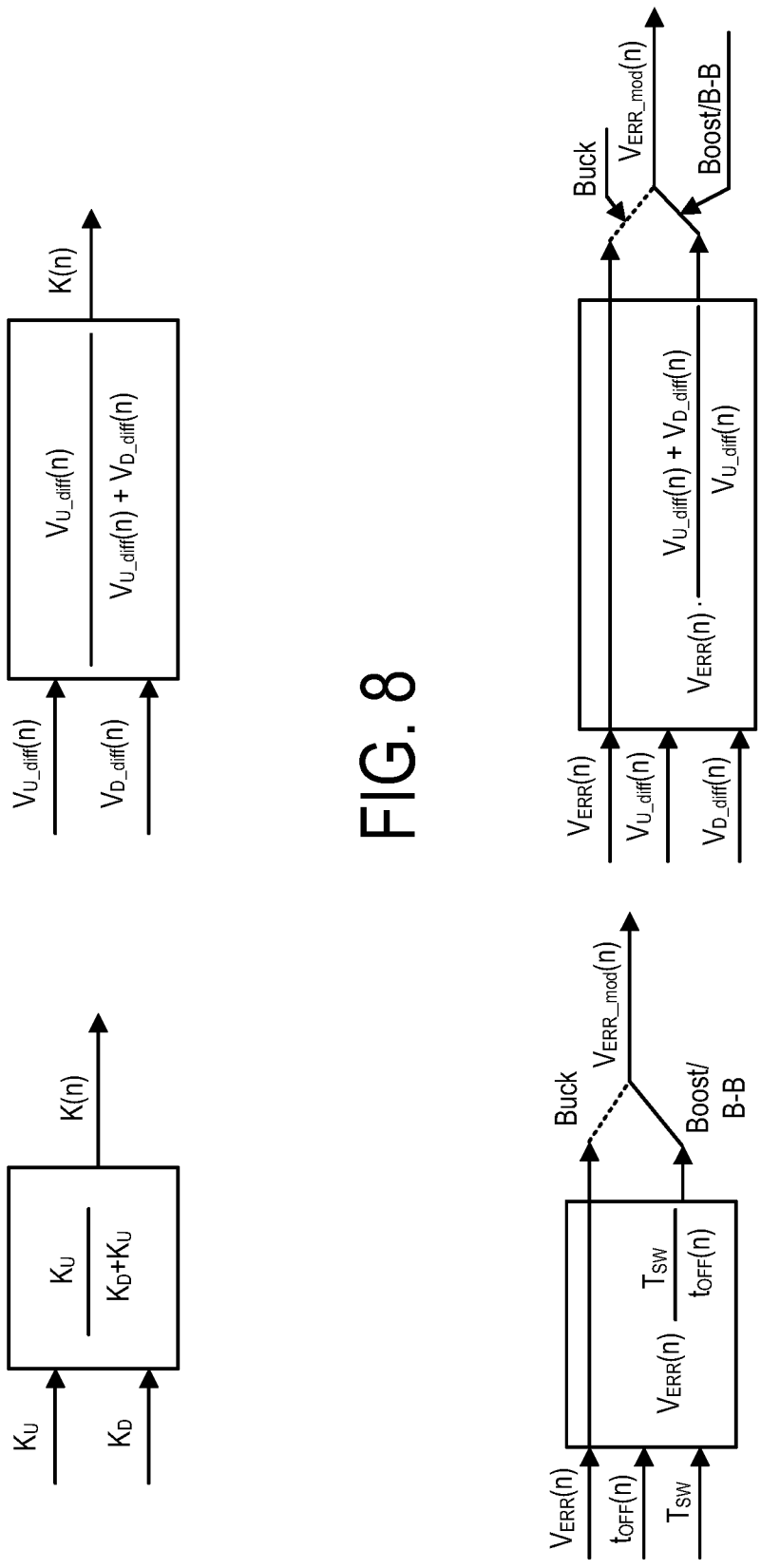
FIG. 8
FIG. 9

METHOD AND APPARATUS FOR PWM CONTROL OF MULTI-MODE SWITCHING POWER SUPPLY USING ITERATIVE AVERAGE CURRENT MODE CONTROL

CROSS-REFERENCE TO RELATED APPLICATION

This application claims the benefit of U.S. Provisional Patent Application No. 63/177,097, filed on Apr. 20, 2021, which is incorporated herein by reference in its entirety.

TECHNICAL FIELD

The present disclosure generally relates to DC-DC converters, and more specifically to controlling multi-mode DC-DC converters that switch between buck, boost, and buck-boost modes of operation.

BACKGROUND

Use of programmable power supplies (PPS) can include a wide range of output voltages (3V-20V) and a wide range of limiting currents (1 A-5 A), both defined digitally with high resolution (e.g. 20 mV, 40 mA). To accommodate a wide range of output voltages in combination with a wide range of input voltages (e.g., 12V to 4V for automotive applications) all three modes of operation of DC-DC converter (buck, boost, buck-boost) may be used, hence multi-mode operation. As output voltage drops due to the current limit, modes of operation may be changed for this reason as well. An abrupt severe drop of input voltage (e.g., 'cold crank' in automotive applications) in combination with a possible abrupt change of output voltage in current limit may lead to dynamically changing modes of operation.

FIG. 1 depicts a multi-mode DC-DC converter for receiving input voltage $V_I$ and delivering regulated DC output voltage $V_O$ to an output load $R_O$ 106. The DC-DC converter of FIG. 1 includes a power stage having: an inductor 100; first, second, and third controlled switches 101,102,103; a fourth controlled switch 104 that is used as a rectifier device, and an output smoothing capacitor 105.

The DC-DC converter of FIG. 1 also includes voltage and current control circuits. The voltage control circuit includes voltage error amplifier 112, which may be a transconductance amplifier, with inverting and non-inverting inputs to generate a current proportional to the difference between a representation of output voltage $V_O$ stepped down with output divider 108 and reference voltage $V_{REF}$, and an output for outputting the generated current to compensation circuit 113 to create a voltage drop (error voltage $V_{ERR}$) across compensation circuit 113, which integrates the difference between the voltages received by the inputs of the voltage error amplifier 112. The current control circuit includes current error amplifier 114, which may be a transconductance amplifier, with inverting and non-inverting inputs to generate an error current proportional to the difference between the voltage drop of the output current across current sense resistor 107 amplified by current sense amplifier 110, which outputs a current sense signal $V_{CS}$, and averaged by average current estimator 116, and reference signal $I_{REF}$. The current error amplifier 114 also has an output for delivering the error current across its compensation circuit 115 to create a voltage drop (current error $I_{ERR}$). The DC-DC converter of FIG. 1 also includes analog OR circuit 117 receiving the respective voltage drops generated responsive to the outputs of the voltage and current error amplifiers 112 and 114 and passing to its output the lowest of the two outputs. A PWM controller 111 receives the output of the analog OR circuit 117 and generates on its output a PWM signal. The PWM controller 111 may be a peak current mode controller with constant switching frequency, but may also be a peak current control constant OFF time controller, or a valley current control constant ON time controller, which may operate at a variable switching frequency. The DC-DC converter of FIG. 1 also includes logic drivers control block 109 receiving on its inputs the PWM signal and input voltage $V_I$ and output voltage $V_O$ and having the MOSFET driving signals A, B, C, D on its outputs. These A, B, C, D signals are formed based on the PWM signal and mode of operation determined by logic drivers control block 109, selected between: buck, boost, or buck-boost. The mode of operation is decided by logic drivers control block 109 based on a comparison of input voltage $V_I$ and output voltage $V_O$ as: buck if $V_I > V_O$, boost if $V_I < V_O$, buck-boost if $V_I \approx V_O$.

In the DC-DC converter of FIG. 1, it may be beneficial to vary the voltage control loop gain for different modes of operation, because maintaining the same voltage control loop gain may cause output voltage ringing when modes are switching.

The voltage and current control loops in the DC-DC converter of FIG. 1 work 'one at a time': when the voltage control loop is stabilizing the output voltage $V_O$, the current error amplifier 114 output is saturated (i.e., outputting its maximum possible voltage) and vice versa. When the DC-DC converter is going into (or out of) current limit, voltage and current loops are interacting through analog OR circuit 117, which may cause output voltage ringing during transitions.

FIG. 2 shows another example of a multi-mode DC-DC converter including all the elements of the converter of FIG. 1 except the analog OR circuit 117. In the DC-DC converter of FIG. 2 the current control loop is inside the voltage control loop and is active all the time using the output of the voltage error amplifier 112, i.e. error voltage Verr as the reference voltage for current error amplifier 114: $V_{ERR} = I_{REF}$. The maximum output voltage of the voltage error amplifier 112 therefore defines the current limit of the DC-DC converter, which may reduce ringing during transitions in and out of the current limit. However, the current control loop being inside the voltage control loop reduces the bandwidth of the voltage control loop. Also, when the DC-DC converter of FIG. 2 changes its mode of operation, the combined gain of the PWM controller 111 and the power stage of the DC-DC converter also changes, which may cause output voltage ringing—the same problem as in the DC-DC converter of FIG. 1.

If peak current mode control is used, changing modes of operation may lead to output voltage ringing above ±5% of the output nominal voltage specified by the relevant standard. It may also be beneficial to use different compensation circuits for the voltage error amplifier based on different modes of operation of the DC-DC converter. Using the same compensation circuit for each mode of operation of the DC-DC converter may exacerbate the output voltage ringing problem. However, even the use of different compensation circuits for different modes of operation may not eliminate output ringing when modes are changed. Entering the current limit and going back to voltage control may also cause ringing because of interaction between voltage and current loops. With two-loop control (i.e. current loop inside the voltage loop), the voltage loop bandwidth may be reduced by the current loop. Therefore, there is a need for a converter that can address these deficiencies.

SUMMARY

According to an aspect of one or more examples, there is provided a converter configured to receive a DC input voltage and provide a DC output voltage, that may include an inductor having a first terminal and a second terminal, a first controlled switch, a second controlled switch, and a third controlled switch, each having a control terminal, a first terminal and a second terminal; wherein the second terminal of the first controlled switch and first terminal of the second controlled switch are coupled to the first terminal of the inductor, the first terminal of the third controlled switch is coupled to the second terminal of the inductor, the first terminal of the first controlled switch is coupled to the DC voltage input, and the second terminals of the second and third control switches are coupled to a common terminal. The converter may include a rectifier device having a second terminal coupled to the second terminal of the inductor, and a first terminal configured to provide the DC output voltage, and a current sense amplifier configured to output a current sense signal over a present switching cycle based on an inductor current through the inductor. The converter may also include a voltage error amplifier configured to output an error voltage based on a difference between a reference voltage and a representation of the DC output voltage, and a pulse width modulation (PWM) controller. The PWM controller may include an error voltage modifier circuit configured to receive the error voltage and a mode signal, and selectively output the error voltage, or a modified error voltage corresponding to a product of the error voltage and a modifying coefficient, based on the mode signal, and an iterative average current control circuit configured to receive the current sense signal and the output from the error voltage modifier circuit, and to generate a pulse width modulation (PWM) signal based on the current sense signal over the present switching cycle and the current sense signal over a previous switching cycle that precedes the present switching cycle. The converter may also include a logic drivers control block configured to receive the PWM signal, output the mode signal based on the DC input voltage and the DC output voltage, and output control signals configured to drive the first, second, and third controlled switches, via their respective control terminals, based on the PWM signal.

According to another aspect of one or more examples, there is provided a buck converter configured to receive a DC input voltage and provide a DC output voltage. The buck converter may include an inductor having a first terminal and a second terminal, and a first controlled switch and a second controlled switch, each having a control terminal, a first terminal and a second terminal, wherein the second terminal of the first controlled switch and first terminal of the second controlled switch are coupled to the first terminal of the inductor, the first terminal of the first controlled switch is coupled to the DC voltage input, and the second terminal of the second control switch is coupled to a common terminal. The buck converter may include a rectifier device having a second terminal coupled to the second terminal of the inductor, and a first terminal configured to provide the DC output voltage. The buck converter may include a current sense amplifier configured to output a current sense signal over a present switching cycle based on an inductor current through the inductor, a voltage error amplifier configured to output an error voltage based on a difference between a reference voltage and a representation of the DC output voltage, and a pulse width modulation (PWM) controller.

The PWM controller may include an iterative average current control circuit configured to receive the current sense signal over the present switching cycle and the error voltage, and to generate a pulse width modulation (PWM) signal based on the current sense signal for the present switching cycle and a current sense signal over a previous switching cycle that precedes the present switching cycle. The buck converter may also include a logic drivers control block configured to receive the PWM signal, and output control signals configured to drive the first and second controlled switches, via their respective control terminals, based on the PWM signal.

According to another aspect of one or more examples, there is provided a boost converter configured to receive a DC input voltage and provide a DC output voltage. The boost converter may include an inductor having a first terminal and a second terminal, wherein the first terminal is coupled to the DC input voltage, and a controlled switch having a control terminal, a first terminal and a second terminal, wherein the second terminal of the controlled switch is coupled to a common terminal, and the first terminal of the controlled switch is coupled to the second terminal of the inductor. The boost converter may include a rectifier device having a second terminal coupled to the second terminal of the inductor, and a first terminal configured to provide the DC output voltage. The boost converter may also include a current sense amplifier configured to output a current sense signal over a present switching cycle based on an inductor current through the inductor, a voltage error amplifier configured to output an error voltage based on a difference between a reference voltage and a representation of the DC output voltage, and a pulse width modulation (PWM) controller.

The PWM controller may include an error voltage modifier circuit configured to receive the error voltage, and output a modified error voltage corresponding to a product of the error voltage and a modifying coefficient, and an iterative average current control circuit configured to receive the current sense signal over the present switching cycle and the modified error voltage, and to generate a pulse width modulation (PWM) signal based on the current sense signal over the present switching cycle and a current sense signal over a previous switching cycle that precedes the present switching cycle. The boost converter may also include a logic drivers control block configured to receive the PWM signal, output the mode signal based on the DC input voltage and the DC output voltage, and output one or more control signals configured to drive the controlled switch, via its controlling gate, based on the PWM signal.

According to another aspect of one or more examples, there is provided a method of generating a pulse width modulation (PWM) signal for a converter configured to receive a DC input and provide a regulated DC output voltage. The method may include obtaining a current sense signal over a preceding switching cycle and a present switching cycle of the converter based on an inductor current through an inductor of the converter, determining a voltage representing an average inductor current over the present switching cycle, obtaining an error voltage based on a difference between a reference voltage and a representation of the regulated DC output voltage, selectively outputting the error voltage or a modified error voltage corresponding to a product of the error voltage and a modifying coefficient, based on an operating mode of the converter, and representing a target average inductor current, and generating the PWM signal based on a difference between said voltage representing the target average inductor current and said voltage representing the average inductor current over the present switching cycle.

BRIEF DESCRIPTION OF DRAWINGS

FIG. 8 shows circuits for providing the slope K(n) of the current sense signal $V_{CS}$ during period 'n' according to various examples of the present disclosure.

FIG. 9 shows circuits for providing modified error voltage for period 'n' $V_{ERR\_mod}(n)$ according to various examples of the present disclosure.

DETAILED DESCRIPTION OF VARIOUS EXAMPLES

Figure 1:
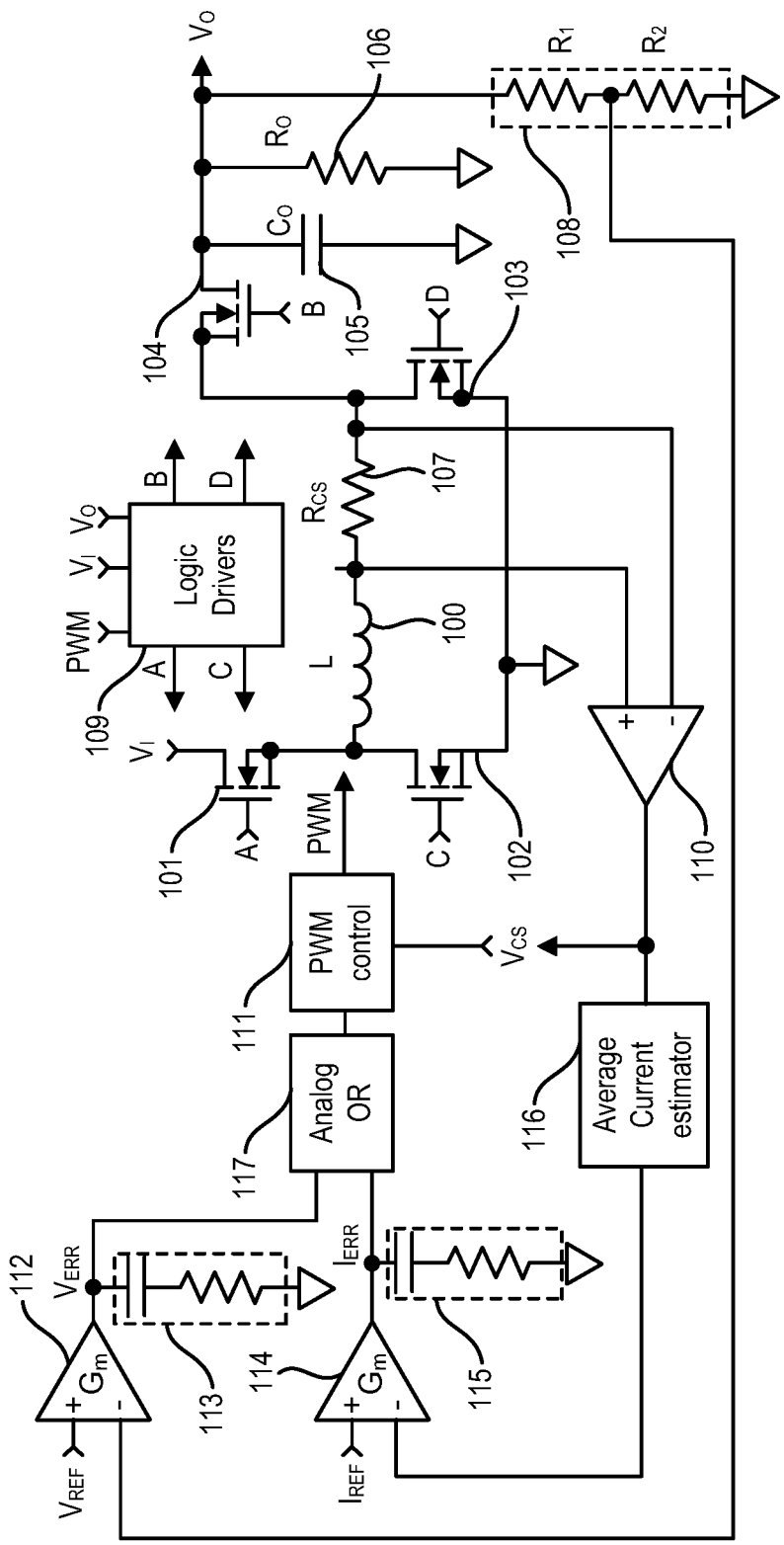
FIG. 1 shows a DC-DC converter according to the prior art.

Reference will now be made in detail to the following various examples, which are illustrated in the accompanying drawings, wherein like reference numerals refer to like elements throughout. The following examples may be embodied in various forms without being limited to the examples set forth herein. Descriptions of well-known parts are omitted for clarity.

Various examples of the present disclosure may address one or more of the problems described above by using an iterative average current mode control, where the output voltage of the error amplifier is proportional to the output current of the power supply. Limiting the current with this control method may be achieved by programming a maximum voltage of the error amplifier. Compensation of the error amplifier for this control method may be the same for any mode of operation, so output voltage ringing caused by switching modes may be reduced. An iterative average current control loop may not suffer from subharmonic oscillations in the same manner as a peak current mode control loop, and may not limit the bandwidth of the error amplifier, facilitating operation at a higher switching frequency.

Figure 3A:
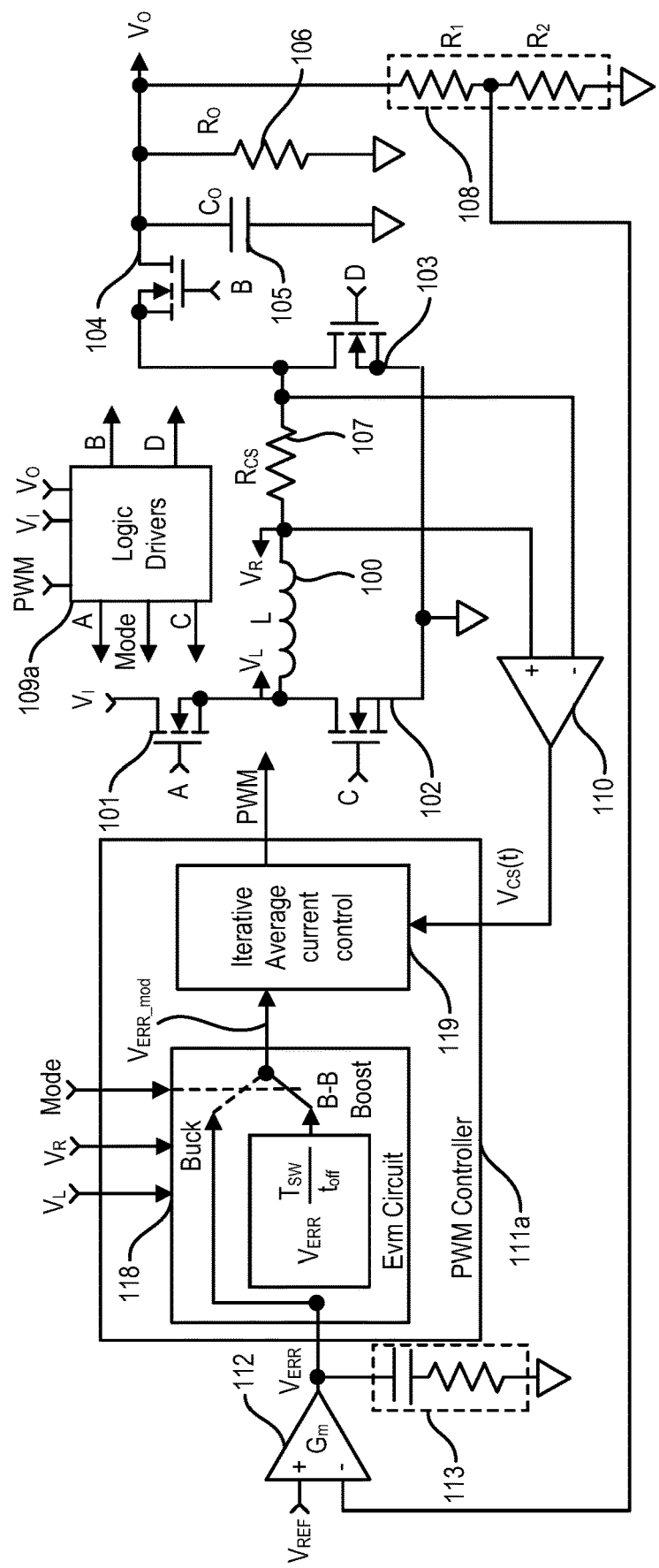
FIG. 3A shows a multi-mode DC-DC converter according to various examples of the present disclosure.

FIG. 3A shows a multi-mode DC-DC converter according to various examples of the present disclosure. Referring to FIG. 3A, the example multi-mode DC-DC converter receives input voltage $V_I$ and delivers a regulated DC output voltage $V_O$ to an output load $R_O$ 106. The multi-mode DC-DC converter of FIG. 3A includes: an inductor 100 having first and second terminals; first, second, and third controlled switches 101, 102, 103; a fourth controlled switch 104, which is used as a rectifier device, and an output smoothing capacitor 105. Fourth controlled switch 104 may be replaced with a diode throughout, and fourth controlled switch 104 may be referred to generally as a rectifier device, i.e. rectifier device 104. In an embodiment where a diode is used in place of fourth controlled switch 104, driving signals for fourth controlled switch 104 may not be required. Each of the first, second, third, and fourth controlled switches 101, 102, 103, 104 include a control terminal, a first terminal, and a second terminal. The second terminal of the first controlled switch 101 and the first terminal of the second controlled switch 102 are coupled to the first terminal of the inductor 100. The first terminal of the third controlled switch 103 is coupled to the second terminal of the inductor 100 via a current sense resistor 107. The first terminal of the first controlled switch 101 is coupled to the DC voltage input $V_I$, and the second terminals of the second and third control switches 102, 103 are coupled to a common (e.g., ground) terminal.

Figure 2:
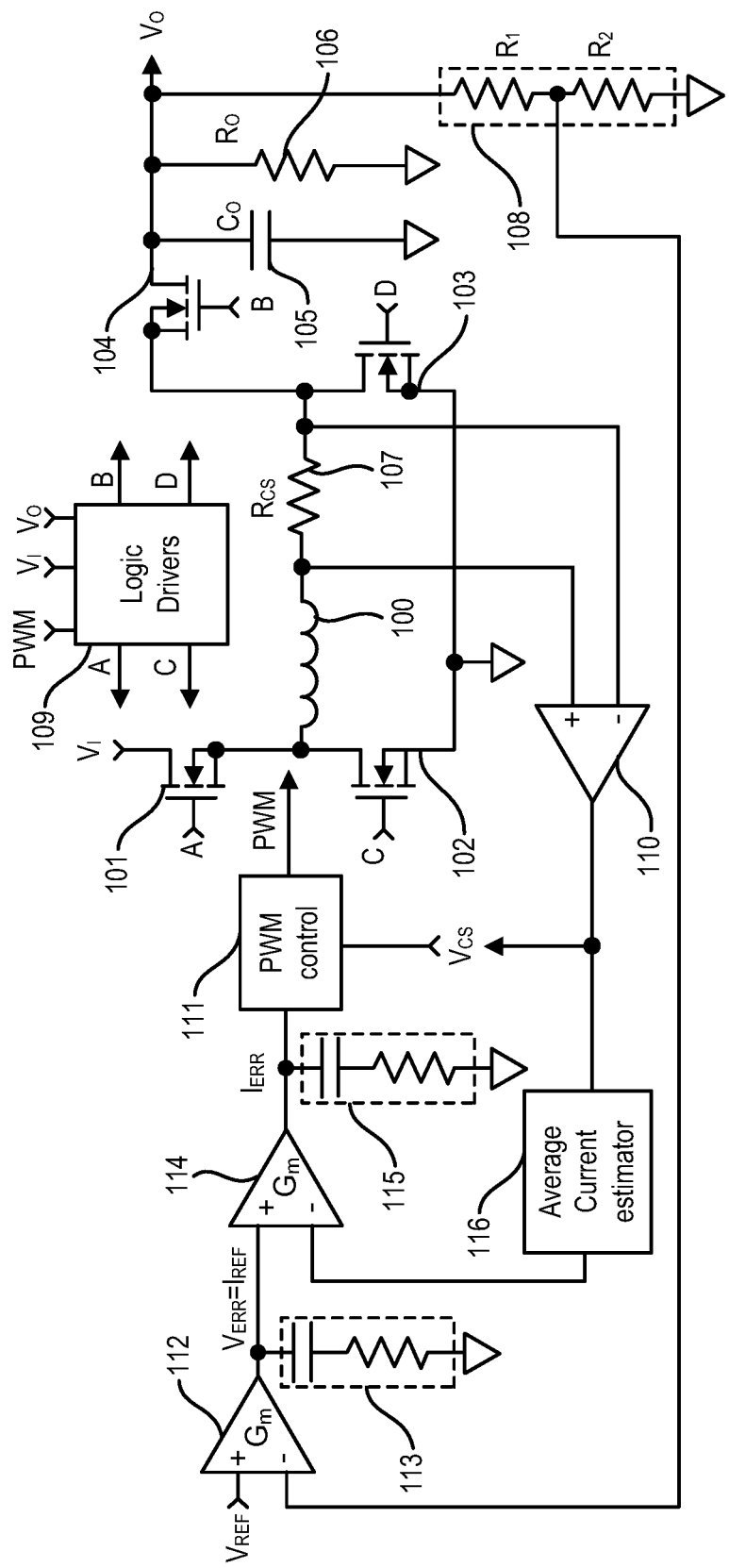
FIG. 2 shows another DC-DC converter according to the prior art.

The multi-mode DC-DC converter of FIG. 3A also includes voltage and current control circuits as well as a logic drivers control block 109a, as explained above in connection with FIG. 1 and FIG. 2, however the logic drivers control block 109a of FIG. 3A also produces a 'mode' signal defining the converter's mode of operation. In particular, the logic drivers control block 109a receives on its respective inputs the PWM signal, input voltage $V_I$, and output voltage $V_O$, and outputs MOSFET driving signals A, B, C, D to the control terminals of the first, fourth, second, and third controlled switches, respectively. These A, B, C, D MOSFET driving signals are formed based on the PWM signal and mode of operation determined by logic drivers control block 109a, selected between: buck, boost, or buck-boost. The mode of operation is decided by logic drivers control block 109a based on a comparison of input voltage $V_I$ and output voltage $V_O$ as: buck if $V_I > V_O$, boost if $V_I < V_O$, buck-boost if $V_I \sim V_O$. The logic drivers control block 109a outputs a 'mode' signal based on the result of the comparison between input voltage $V_I$ and output voltage $V_O$.

The voltage control circuit includes voltage error amplifier 112, which may be a transconductance amplifier (as shown) or an operational amplifier, for example, with inverting and non-inverting inputs to generate a current proportional to the difference between a representation of output voltage $V_O$, in the present example output voltage $V_O$ stepped down with output divider 108, and reference voltage $V_{REF}$, and an output for outputting the generated current to compensation circuit 113 to create a voltage drop (error voltage $V_{ERR}$) across compensation circuit 113, which integrates the difference between the voltages received by the inputs of the voltage error amplifier 112.

Figure 3B:
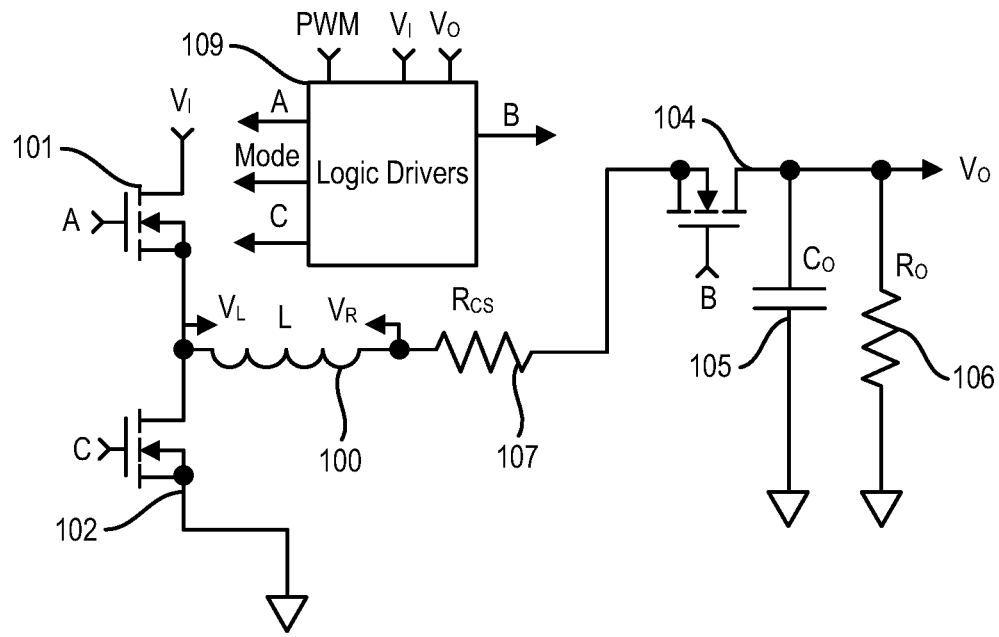
FIG. 3B shows the power stage of a buck converter according to various examples of the present disclosure.
Figure 3C:
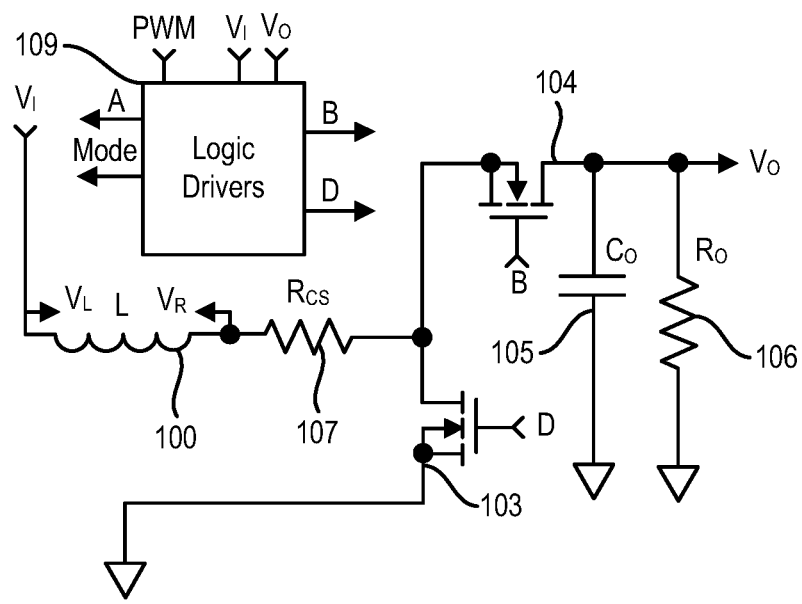
FIG. 3C shows the power stage of a boost converter according to various examples of the present disclosure.

Although the converter of FIG. 3A is shown as a multi-mode converter capable of switching between buck, boost, and buck-boost modes, various examples of the present disclosure also include single-mode buck, boost, and buck-boost converters. For example, FIG. 3B shows the power stage of a buck converter according to various examples of the present disclosure. In contrast to the multi-mode converter of FIG. 3A, the power stage of the example buck converter of FIG. 3B does not include third controlled switch 103. On the other hand, FIG. 3C shows the power stage of a boost converter according to various examples of the present disclosure. In contrast to the multi-mode converter of FIG. 3A, the power stage of the example boost converter of FIG. 3C does not include first and second controlled switches 101 and 102. For a pure buck-boost converter, the power stage of the multi-mode converter of FIG. 3A does not change, except that the logic drivers control block 109a would not need to output a 'mode' signal.

Referring again to FIG. 3A, the current control circuit includes current sense resistor 107 with a resistance Res, current sense amplifier 110 and a PWM controller 111a, which PWM controller 111a includes an error voltage modifier (EVM) circuit 118 configured to receive the output error voltage $V_{ERR}$ of the voltage error amplifier 112, the 'mode' signal defining the mode of operation of the DC-DC converter, and signals $V_L$, $V_R$ from respective terminals of the inductor 100 on yet two other inputs. The EVM circuit 118 produces a modified error voltage signal $V_{ERR\_mod}$. The PWM controller 111a also includes an iterative average current control (IACC) circuit 119 configured to receive on one of its inputs the modified error voltage $V_{ERR\_mod}$ output by the EVM circuit 118 and receive current sense signal $V_{CS}$ from the output of the current sense amplifier 110 on another input. The IACC circuit 119 generates the PWM signal on its output based on the current sense signal $V_{CS}$ over the present switching cycle and the current sense signal $V_{CS}$ over a previous switching cycle that precedes the present switching cycle, as explained in more detail below.

Figure 4:
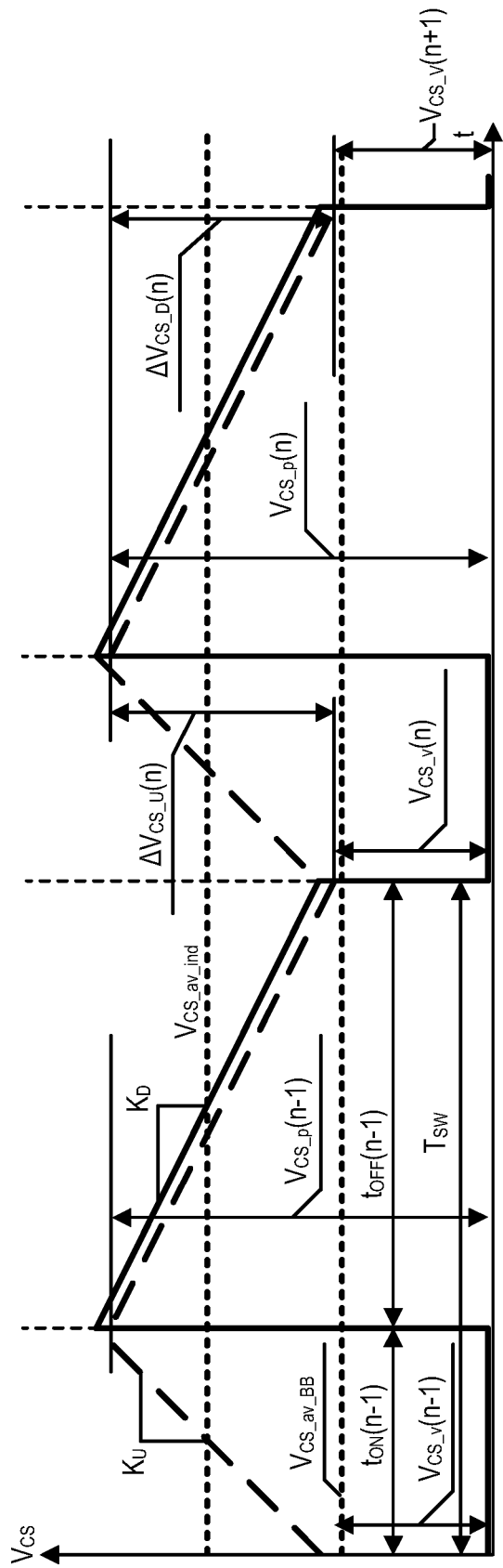
FIG. 4 shows a steady state waveform diagram corresponding to the multi-mode DC-DC converter of FIG. 3A.
Figure 5:
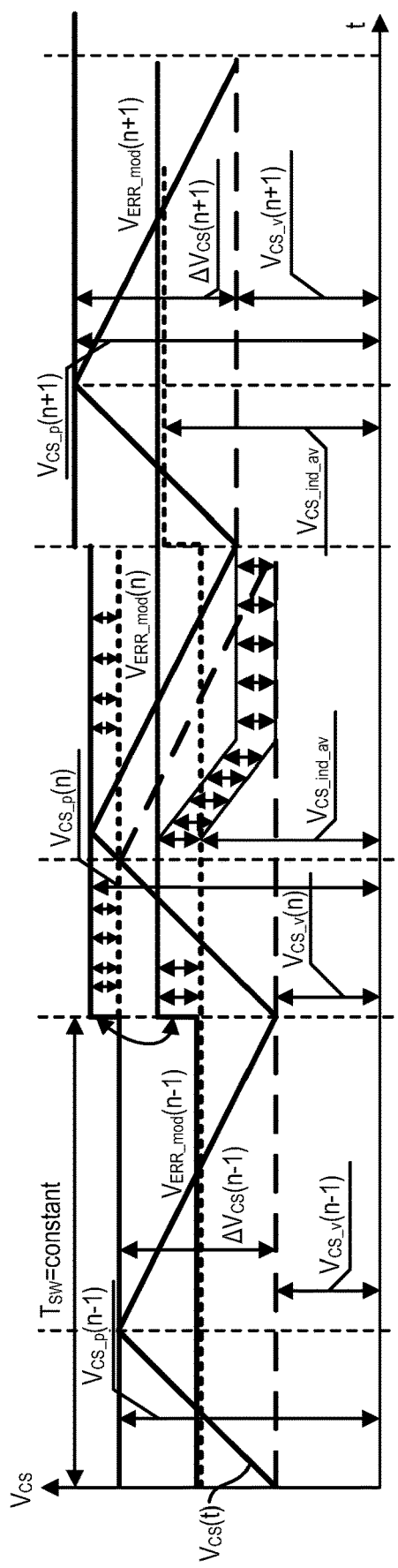
FIG. 5 shows a transient waveform diagram illustrating a constant switching frequency control algorithm corresponding to the multi-mode DC-DC converter of FIG. 3A.

The graph in FIG. 4 shows a steady state waveform diagram corresponding to the multi-mode DC-DC converter of FIG. 3A, and FIG. 5 shows a transient waveform diagram illustrating a constant switching frequency control algorithm corresponding to the multi-mode DC-DC converter of FIG. 3A, where $V_{CS}$—current sense signal output by current sense amplifier 110;

$V_{CS\_P}(n-1)$, $V_{CS\_P}(n)$, $V_{CS\_P}(n+1)$—current sense signal for peak inductor 100 current in 'previous,' 'present,' and 'next' switching cycles, respectively;

$V_{CS\_V}(n-1)$, $V_{CS\_V}(n)$, $V_{CS\_V}(n+1)$—current sense signal for valley inductor 100 current in 'previous,' 'present,' and 'next' switching cycles, respectively;

$\Delta V_{CS\_U}(n) = V_{CS\_P}(n) - V_{CS\_V}(n)$—change of the current sense signal $V_{CS}$ in switching cycle n during ON time;

$V_{CS\_av\_ind}$—target average inductor current;

$V_{CS\_av\_BB}$—average current into output smoothing capacitor 105 from inductor 100 in Boost or Buck-Bust mode.

$t_{ON}(n-1)$, $t_{OFF}(n-1)$—ON and OFF time of the DC-DC converter, respectively, in switching cycle n-1 (i.e. previous switching cycle);

$K_U$, $K_D$–dV/dt—of the UP slope and DOWN slope of the current sense signal $V_{CS}$, respectively;

$\Delta V_{CS\_D}(n) = V_{CS\_P}(n) - V_{CS\_V}(n+1)$—change of the current sense signal $V_{CS}$ in switching cycle n during OFF time; and $T_{SW}$=the period of the switching cycle.

The current sense signal $V_{CS}$ ripple $\Delta V_{CS}$, which is equivalent to $\Delta V_{CS\_D}(n)$ and $\Delta V_{CS\_U}(n)$ under steady state conditions, can be expressed through $K_U$, $K_D$ according to Equation (1) as follows:

$$\Delta V_{CS} = \frac{K_D \cdot K_U \cdot T_{SW}}{K_D + K_U} \quad (1)$$

The UP and DOWN slope of the current sense signal $V_{CS}$ can be respectively represented by Equations (2) and (3) below:

$$K_U(n) = \frac{V_{CS\_P}(n) - V_{CS\_V}(n)}{t_{ON}(n)} \quad (2)$$

$$K_D(n) = \frac{V_{CS\_P}(n) - V_{CS\_V}(n+1)}{t_{OFF}(n)} \quad (3)$$

The error voltage $V_{ERR}(n)$ for the present switching period 'n' can be defined according to Equation (4) below:

$$V_{ERR}(n) = V_{CS\_av}(n) \quad (4)$$

$V_{CS\_av}(n)$ is defined as the average value of the current sense signal $V_{CS}$ over the present switching period 'n' and may be determined according to Equations (5) and (6) below:

$$V_{CS\_av}(n) = \frac{V_{CS\_P}(n) - V_{CS\_V}(n+1)}{2} \cdot \frac{t_{OFF}(n)}{T_{SW}} \quad (5)$$

—for Buck-Boost or Boost $$V_{CS\_av}(n) = \frac{V_{CS\_P}(n) + V_{CS\_V}(n+1)}{2} \quad (6)$$

—for Buck topology

From Equations (4) and (5), the error voltage $V_{ERR}(n)$ for the present switching period 'n' can be defined according to Equations (7) and (8) below:

$$V_{ERR}(n) = \frac{V_{CS\_P}(n) + V_{CS\_V}(n+1)}{2} \cdot \frac{t_{OFF}(n)}{T_{SW}} \quad (7)$$

—for Buck-Boost or Boost $$V_{ERR}(n) = \frac{V_{CS\_P}(n) + V_{CS\_V}(n+1)}{2} \quad (8)$$

—for Buck topology

Modifying Equation (7) yields Equation (9) below:

$$V_{ERR}(n) \cdot \frac{T_{SW}}{t_{OFF}(n)} = \frac{V_{CS\_P}(n) + V_{CS\_V}(n+1)}{2} \quad (9)$$

A modified error voltage $V_{ERR\_mod}(n)$ for the present switching period 'n' is provided by Equation (10) below:

$$V_{ERR\_mod}(n) = \begin{vmatrix} (V_{ERR}(n)) \text{ if Buck\_mode} \\ \left(V_{ERR}(n) \cdot \frac{T_{SW}}{t_{OFF}}\right) \text{ if Buck\_Boost\_or\_Boost\_mode} \end{vmatrix} \quad (10)$$

Utilizing Equation (9), Equation (10) can be rewritten as Equation (11) below for Buck Boost or Boost modes, wherein the modified error voltage $V_{ERR\_mod}(n)$ is calculated to equal a target average inductor current $V_{CS\_av\_ind}(n)$:

$$V_{ERR\_mod}(n) = \frac{V_{CS\_P}(n) + V_{CS\_V}(n+1)}{2} = V_{CS\_av\_ind}(n) \quad (11)$$

The further disclosure will be based (until otherwise noted) on a constant switching frequency PWM control mode.

Using peak current mode control, the error voltage $V_{ERR}$ for a present switching cycle 'n' may be determined according to Equation (12) below:

$$V_{ERR}(n) = V_{CS\_P}(n) \quad (12)$$

As indicated by Equation (12), the error voltage $V_{ERR}$ could be implemented on each individual switching cycle based on the value of $V_{ERR}(n)$. However, when using an iterative average current mode control according to various examples of the present disclosure, an algorithm where the controlling action (turning the control terminal OFF) during the present switching cycle (n) may be based not only on the value $V_{ERR}(n)$ but also on information from the previous switching cycle (n−1) e.g. $V_{CS\_V}(n−1)$, hence the word 'iterative' in the name of this control mode.

FIG. 5 depicts a waveform of $V_{CS}(t)$, the current sense signal $V_{CS}$ as a function of time, which is steady state until switching cycle (n) and in regulation with average value $V_{CS\_av\_ind} = V_{ERR\_mod}(n−1)$, where $V_{ERR\_mod}(n−1)$ is the modified error voltage for the previous switching cycle 'n−1.' In the beginning of the present switching cycle (n), the modified error voltage for the previous switch cycle (n−1), $V_{ERR\_mod}(n−1)$, changes to a new level, $V_{ERR\_mod}(n)$, and stays at this level throughout the present switching cycle. To achieve regulation at this new level for $V_{ERR\_mod}$, a new level of $V_{CS\_P}(n)$ may be determined from the following Equation (13), in which the value of $V_{CS\_V}$ increases from cycle (n) to cycle (n+1) by the same amount that the modified error voltage $V_{ERR\_mod}$ increased from cycle (n−1) to cycle (n):

$$V_{CS\_V}(n+1) - V_{CS\_V}(n) = V_{ERR\_mod}(n) - V_{ERR\_mod}(n-1) \quad (13)$$

Equation (13) is based on the notion that $V_{CS}$ ripple $\Delta V_{CS}$ remains the same over time, which yields Equation (14) below:

$$V_{CS\_av\_ind}(n+1) = V_{ERR\_mod}(n+1) \quad (14)$$

Equation (13) (as could be shown by calculation) is achieved if Equation (15) is satisfied:

$$V_{CS\_P}(n) - V_{CS\_P}(n-1) = \frac{K_U}{K_U + K_D} \cdot (V_{ERR\_mod}(n) - V_{ERR\_mod}(n-1)) \quad (15)$$

Equations (16) and (17) below are strictly correct under steady-state conditions, but substituting Equations (16) and (17) into Equation (15) for any condition yields an overall algorithm for iterative average current mode control with constant switching frequency, as shown in Equation (18) below:

$$V_{ERR_{mod}}(n-1) = V_{CS_V}(n) + \frac{\Delta V_{CS}}{2} \quad (16)$$

$$V_{CS\_P}(n-1) = V_{CS_V}(n) + \frac{\Delta V_{CS}}{2} \quad (17)$$

$$V_{CS\_P}(n) = \quad (18)$$
$$V_{CS\_V}(n) + \Delta V_{CS} + \frac{K_U}{K_U + K_D} \cdot \left(V_{ERR\_mod}(n) - V_{CS\_V}(n) - \frac{\Delta V_{CS}}{2}\right)$$

In Equation (18) $K_U$, $K_D$, and $\Delta V_{CS}$ are defined by Equations (1), (2) and (3), and can be measured and calculated within each switching cycle. Other implementations of algorithm (18) are disclosed below.

Figure 6:
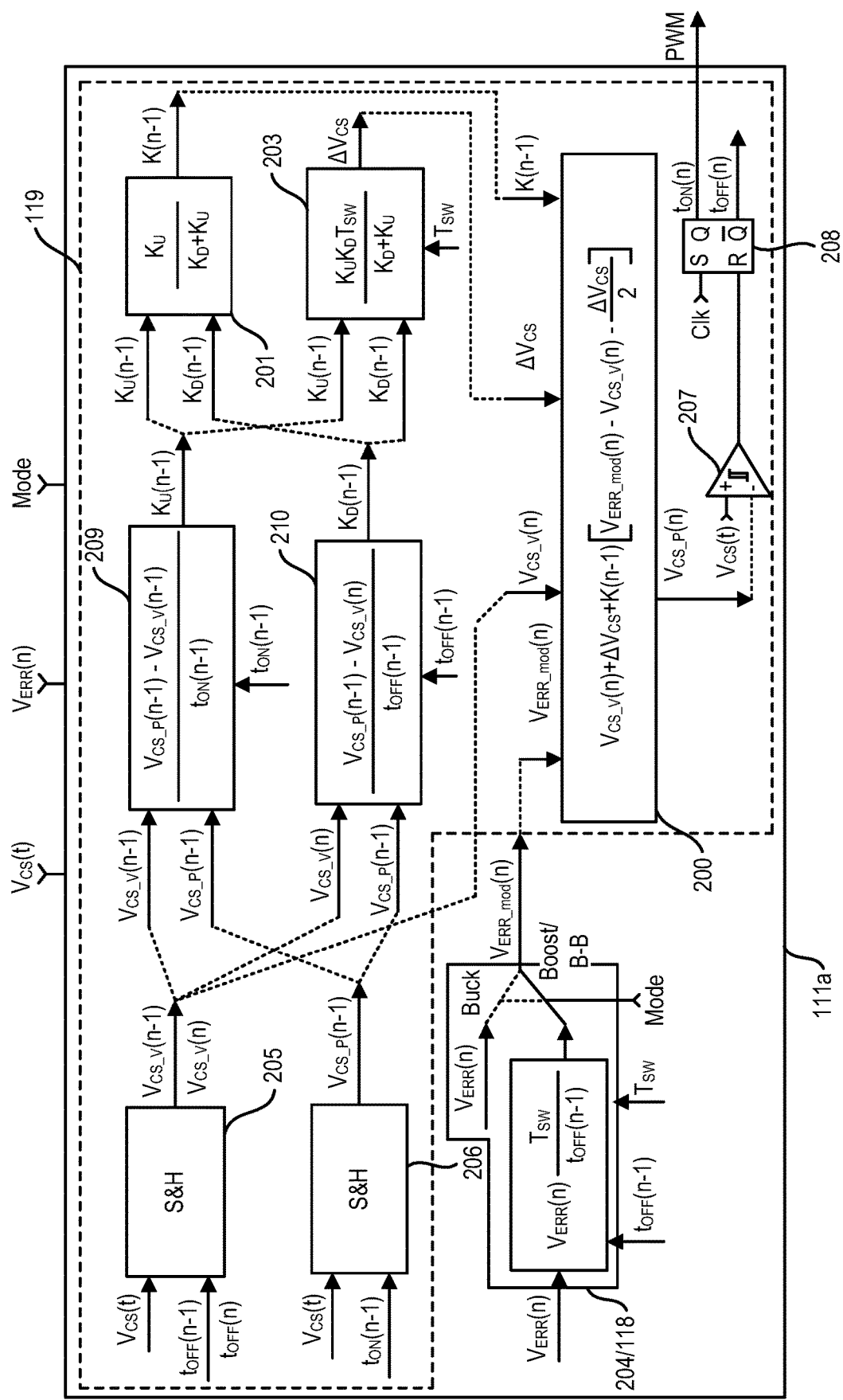
FIG. 6 shows a pulse width modulator (PWM) controller according to various examples of the present disclosure.

A block diagram representing algorithm (18) according to various examples of the present disclosure is presented in FIG. 6. The PWM controller of FIG. 6 is one possible implementation of an iterative average current mode control method operating in a constant switching frequency mode according to various examples of the present disclosure, and is an example of PWM controller 111a of FIG. 3A, although the implementation shown in FIG. 6 does not receive signals from respective terminals $V_L$ and $V_R$ of the inductor 100. Signal $V_{CS\_P}(n)$ on the output of a control signal calculator circuit 200 is compared to signal $V_{CS}(t)$ by comparator 207. On the condition $V_{CS}(t) > V_{CS\_P}(n)$, the output signal of the comparator 207 resets a flip-flop circuit 208, which is in the present example provided with hysteresis, terminating the ON time of the switching cycle (n), and setting the PWM signal to a second state. Flip-flop circuit 208 sets by the clock (signal Clk, FIG. 6), starting the ON time of the next switching cycle and setting the PWM signal to a first state, opposite the second state.

Control signal calculator circuit 200 generates its output signal $V_{CS\_P}(n)$ as a linear combination of signals: $[V_{CS\_V}(n) + \Delta V_{CS}]$ and $[V_{ERR\_mod}(n) - V_{CS\_V}(n) - \Delta V_{CS}/2]$ multiplied by adaptive (calculated for each switching cycle) coefficient K(n−1). Control signal calculator circuit 200, and the other calculating blocks described herein, may be implemented using analog adders, subtractors, and multipliers, as would be understood by those skilled in the art.

Coefficient K(n−1) is generated by a modifying coefficient calculator circuit (shown as calculating block (CB) 201), which receives its two inputs $K_U(n-1)$—up-slope and $K_D(n-1)$—down-slope of the current sense signal $V_{CS}$ during the previous switching cycle (n−1). The modifying coefficient calculator circuit 201 is a divider, in which the numerator is the first input $K_U(n-1)$ and the denominator is the sum of two inputs $[K_U(n-1)+K_D(n-1)]$.

Signal $\Delta V_{CS}$ ($V_{CS}$ ripple) is generated by CB 203, which receives its three inputs $K_U(n-1)$—up-slope, $K_D(n-1)$—down-slope of the current sense signal $V_{CS}$ during the previous switching cycle (n−1), and $T_{SW}$—switching period, and generates its output based on Equation (1) above. CB 203 is a combination of a multiplier-divider and an adder with three inputs: the numerator receiving signals $K_U(n-1)$, $K_D(n-1)$, $T_{SW}$ and an adder forming signal $([K_U(n)+K_D(n)]$ as denominator. The result of calculation $\Delta V_{CS}$ is not iterative, e.g., it is correct for every switching cycle, including transients.

The $V_{ERR\_mod}(n)$ signal (modified $V_{ERR}$ signal, see Equation (10)) is generated by an error voltage modifier circuit (shown as CB 204), which receives its four input signals ($V_{ERR}(n)$, $T_{SW}$, $t_{OFF}(n-1)$, Mode) and is based on Equation (10). CB 204 is an example of EVM circuit 118 in FIG. 3A, and is a multiplier-divider with two inputs in the numerator ($V_{ERR}(n)$, $T_{SW}$)) and a signal $t_{OFF}(n-1)$ in the denominator. In buck mode, $V_{ERR}$ is not modified (see Equation (10)). In boost or buck-boost mode, CB 204 outputs a modified error voltage $V_{ERR\_mod}(n)$ that equals the product of $V_{ERR}(n)$ and $T_{SW}$ divided by $t_{OFF}(n-1)$, whereas in buck mode CB 204 outputs modified error voltage $V_{ERR\_mod}(n)$ that equals $V_{ERR}(n)$.

Coefficient signals $K_U(n-1)$—upslope, $K_D(n-1)$—downslope of the current sense signal $V_{CS}$ during the previous switching cycle (n−1), used as inputs for CBs 203, 201 are generated by CBs 209, 210, both of which are divider circuits with a subtractor circuit forming the numerator signal as the difference between the $V_{CS\_p}$ and $V_{CS\_v}$ inputs and using $t_{ON}(n-1)$ and $t_{OFF}(n-1)$ input signals, respectively as the denominator. CB 209 receives as inputs signals $V_{CS\_p}(n-1)$, $V_{CS\_v}(n-1)$ to form the difference $[V_{CS\_p}(n-1)-V_{CS\_v}(n-1)]$ as the numerator signal and $t_{ON}(n-1)$ as the denominator signal and passes $K_U(n-1)$ on its output to each of CB 201 and 203. CB 210 receives on its inputs signals $V_{CS\_p}(n-1)$, $V_{CS\_v}(n)$ to form the difference $[V_{CS\_p}(n-1)-V_{CS\_v}(n)]$ as the numerator signal and $t_{OFF}(n-1)$ as the denominator signal and passes $K_U(n-1)$ to its output to each of CB 201 and 203.

The signals $V_{CS\_v}(n-1)$, $V_{CS\_v}(n)$ are generated by 'sample and hold' (S&H) circuit 205 receiving on its inputs signal $V_{CS}$ and signal $t_{OFF}(n)$ i.e. the PWM off signal of the present cycle. S&H circuit 205 may sample the current sense signal $V_{CS}$ at the end of the $t_{OFF}(n)$ signal.

The signal $V_{CS\_p}(n-1)$ is generated by 'sample and hold' (S&H) circuit 206 receiving on its inputs signal $V_{CS}$ and signal $t_{ON}(n-1)$, i.e. the PWM on signal of the previous cycle. S&H circuit 206 may sample the current sense signal $V_{CS}$ at the end of the $t_{ON}(n-1)$ signal.

In the implementation of the iterative average current mode controller (IACMC) according to various examples of the present disclosure, which PWM controller 111a is an example IACMC, S&H circuits, multipliers-dividers (MD) and summers/subtractors are used for processing input information and generating desired outputs. In the description of the implementation, the specific options for implementation are not specified, e.g. analog versus digital S&H circuits, MDs or summers/subtractors, any of which may be used.

Similarly, signals are not specified as being analog or digital, as analog signals could be easily transferred into digital format with an appropriate ADC. As is obvious to anyone skilled in the art, the described specifics of the implementation are merely examples, and are not intended to be limiting.

The iterative nature of the above-described control principle allows use of steady-state relationships between some variables (e.g., $t_{ON}$, $t_{OFF}$, $T_{SW}$ and voltages across inductor) under any conditions and still achieves the correct steady-state result. Thus, the following example may present additional benefits in simplicity of the implementation.

The definition of the coefficients $K_U$, $K_D$ was previously described above in Equations (2) and (3), and in terms of this definition the main equations for inductor L could be written down according to Equation (19) below:

$$LK_U = R_{CS}V_U \quad LK_D = R_{CS}V_D \tag{19}$$

Where $V_U$, $V_D$ are voltages across inductor 100, having an inductance L, during $t_{ON}(n-1)$ and $t_{OFF}(n-1)$, and $R_{CS}$ is the resistance of sense resistor 107. The voltages $V_U$, $V_D$ may be different for different modes of operation of the DC-DC converter and are presented in the Table below:

|  | Buck | B-B | Boost |  |  |
| --- | --- | --- | --- | --- | --- |
| $K_U$ | $V_I V_O$ | $V_I$ | $V_I$ | $V_U$ | $V_{U\_diff}(n)$ |
| $K_D$ | $V_O$ | $V_O$ | $V_O$-$V_I$ | $V_D$ | $V_{D\_diff}(n)$ |

Figure 7:
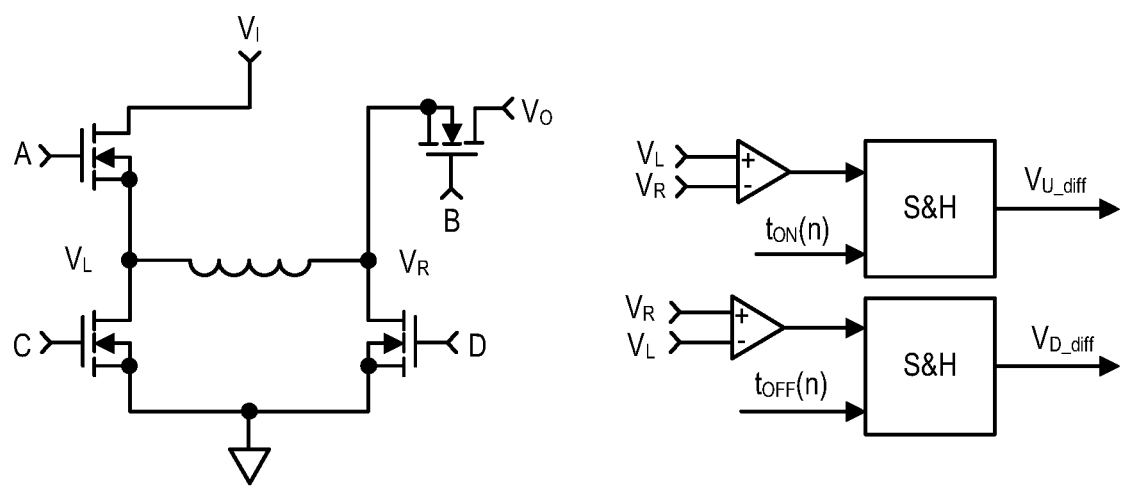
FIG. 7 shows a circuit diagram illustrating how voltages $V_{U\_diff}$ and $V_{D\_diff}$ are provided according to various examples of the present disclosure.

FIG. 7 also shows voltages $V_{U\_diff}(n)$ and $V_{D\_diff}(n)$ as voltages across the inductor 100 that were sampled and held at the end of $t_{ON}$ or at the end of $t_{OFF}$, respectively. Use of these voltages instead of voltages $V_U$ and $V_D$ may reduce errors related to voltage drops on MOSFETs A, B, C, D, as explained further below.

As it follows from Equation (19), $K_U$ and $K_D$ are proportional to $V_{U\_diff}$ and to $V_{D\_diff}$, respectively and since they are used as ratios, they could be replaced with the variables $V_{U\_diff}$, $V_{D\_diff}$ as shown in FIG. 8. FIG. 8 illustrates application of this principle to the calculation of K(n), showing side by side two examples of calculating coefficient K(n). The detailed justification of this approach is as follows.

Equation (19) can be rewritten to yield Equations (20):

$$\frac{L}{R_{CS}} \cdot \frac{\Delta V_{CS\_U}}{t_{ON}} = V_U \quad \frac{L}{R_{CS}} \cdot \frac{\Delta V_{CS\_D}}{t_{OFF}} = V_D \tag{20}$$

Knowing that at steady state condition $\Delta V_{CS\_U} = \Delta V_{CS\_D}$, the second equation of (20) is divided by the first one, and after cancellation of the equal values, yields the first equation of (21) and formally adding 1 to its left and right parts yields the second equation of (21)

$$\frac{t_{ON}}{t_{OFF}} = \frac{V_D}{V_U} \quad \frac{t_{ON}}{t_{OFF}} + 1 = \frac{V_U}{V_D} + 1 \tag{21}$$

Taking into consideration that $T_{SW} = t_{ON} + t_{OFF}$, yields Equation (22) below:

$$\frac{T_{SW}}{t_{OFF}} = \frac{V_D + V_U}{V_U} \tag{22}$$

Substituting Equation (22) into Equation (10), yields Equation (23) below:

$$V_{ERR\_mod}(n) = V_{ERR}(n) \cdot \frac{V_{D\_diff}(n) + V_{U\_diff}(n)}{V_{U\_diff}(n)} \quad (23)$$

FIG. 9 demonstrates two example applications of Equation (23) to the calculation of the modified error voltage $V_{ERR\_mod}(n)$, with the approach on the right side using $V_{U\_diff}(n)$, $V_{D\_diff}(n)$ and $V_{ERR}(n)$. The approach on the left side has been described above in relation to CB 204 in FIG. 6.

Figure 10:
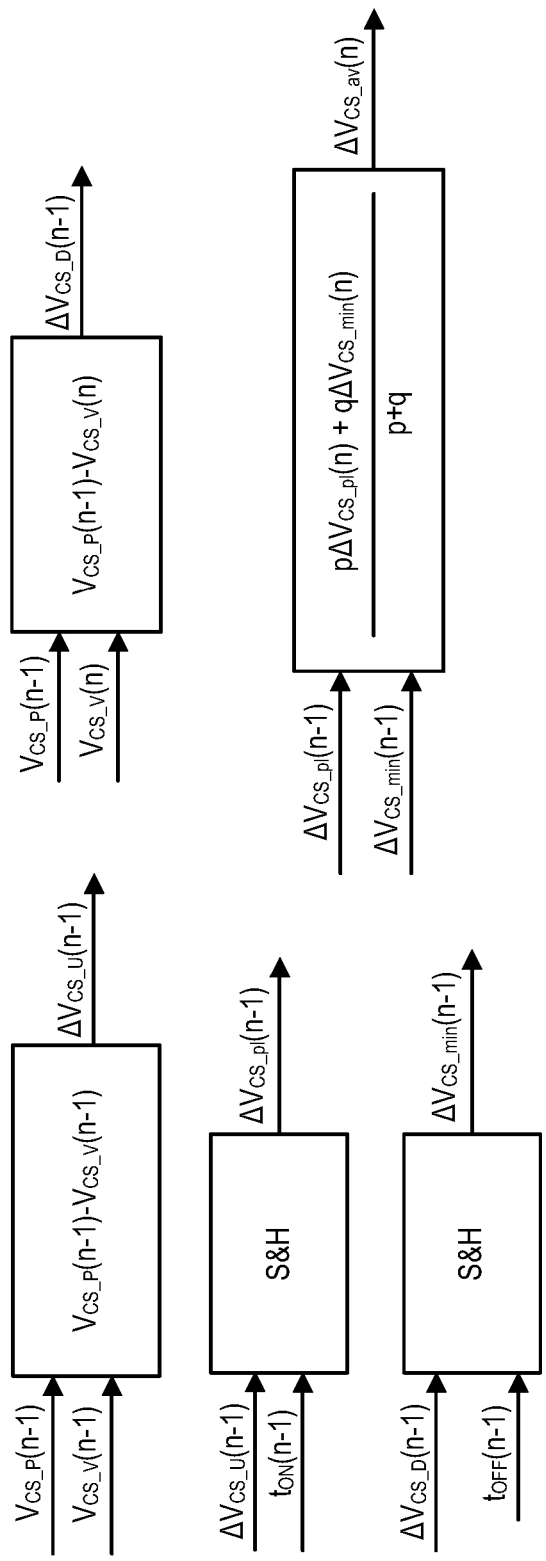
FIG. 10 shows circuits for providing an average change in current sense signal over a period 'n' $\Delta V_{CS\_av}(n)$ according to various examples of the present disclosure.
Figure 11:
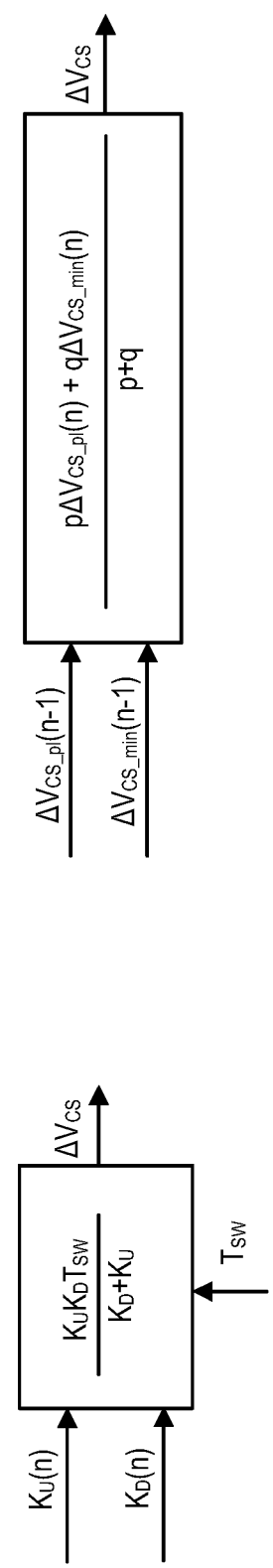
FIG. 11 shows circuits for providing a change in current sense signal $\Delta V_{CS}$ according to various examples of the present disclosure.

Calculation of $\Delta V_{CS}$, which was described above according to Equation (1), could also be achieved without the use of a multi-input multiplier divider as described above in relation to CB 203. $\Delta V_{CS}$ may be calculated as a steady-state $V_{CS}$ ripple and could be measured directly in the previous cycle and then sampled and held for the calculations in the present cycle. Also, some averaging over up-slope and down-slope may achieve some quality improvement. An example of this process is illustrated by FIG. 10. In FIG. 10, $\Delta V_{CS\_pl}(n)$ and $\Delta V_{CS\_min}(n)$ are sampled and held values of up-slope and down-slope of the current sense signal $V_{CS}$, respectively, to be used in the calculations for the next cycle. P and q are averaging coefficients meeting the condition: $p/(p+q)+q/(p+q)=1$. FIG. 11 shows a side by side comparison of $\Delta V_{CS}$ calculation using formula (1) and using direct measurement with averaging.

Figure 12A:
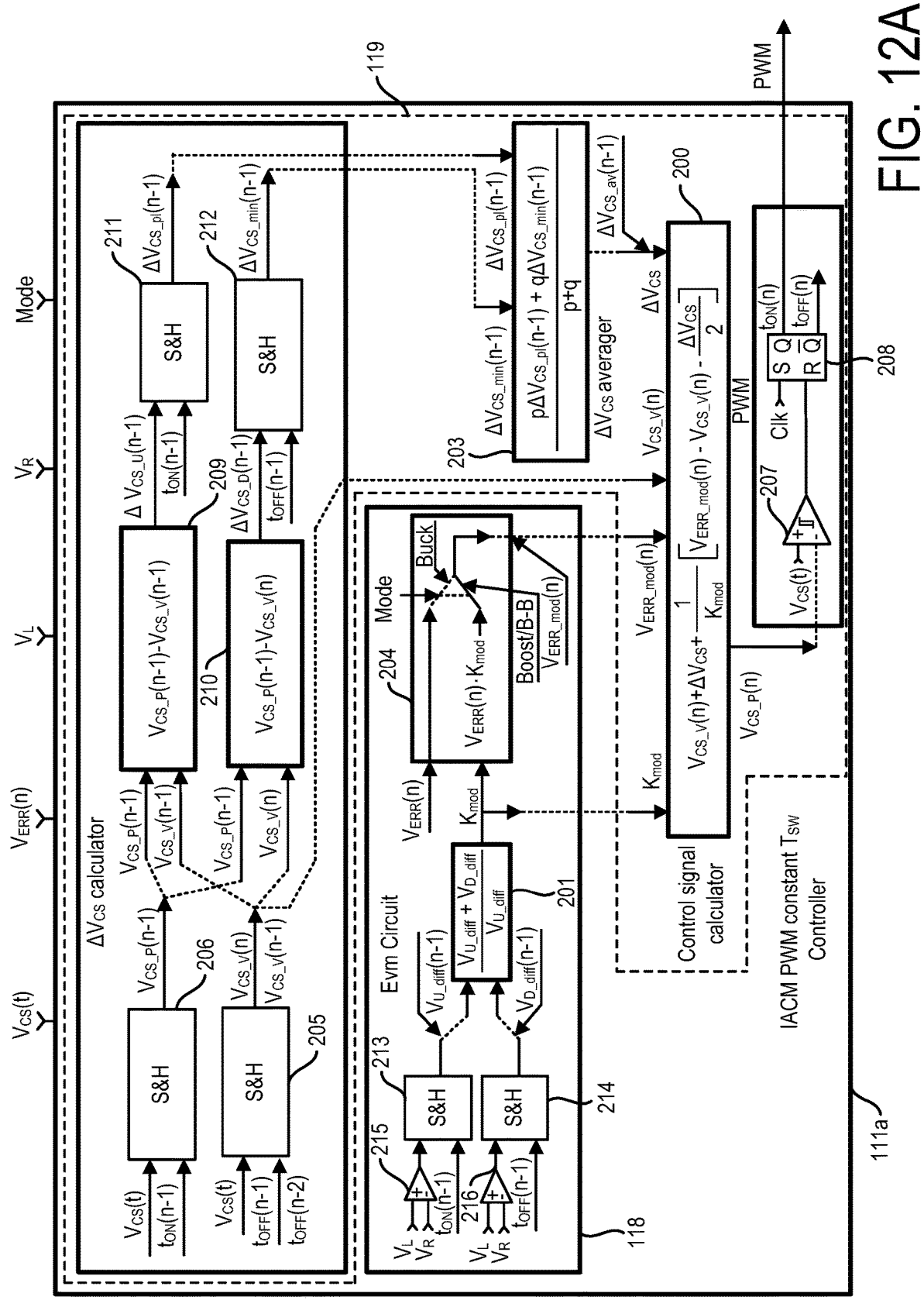
FIG. 12A shows a block diagram of an iterative average current mode (IACM) pulse width modulation (PWM) controller with constant switching frequency modulation according to various examples of the present disclosure.

FIG. 12A shows an example of an iterative average current mode (IACM) PWM Controller with constant switching frequency modulation. Referring to FIG. 12A, which is an example of the PWM controller 111a of FIG. 3A, signal $V_{CS\_P}(n)$ on the output of the control signal calculator circuit 200 is compared to signal $V_{CS}(t)$ by comparator 207, which is illustrated as being supplied with hysteresis. On the condition $V_{CS}(t) > V_{CS\_P}(n)$ the output signal of the comparator 207 resets the flip-flop circuit 208, terminating the ON time of the switching cycle (n), and setting the PWM signal to a second state. Flip-flop circuit 208 is set by the clock (signal Clk, FIG. 6), starting the ON time of the next switching cycle, and setting the PWM signal to a first state, opposite the second state.

Figure 12B:
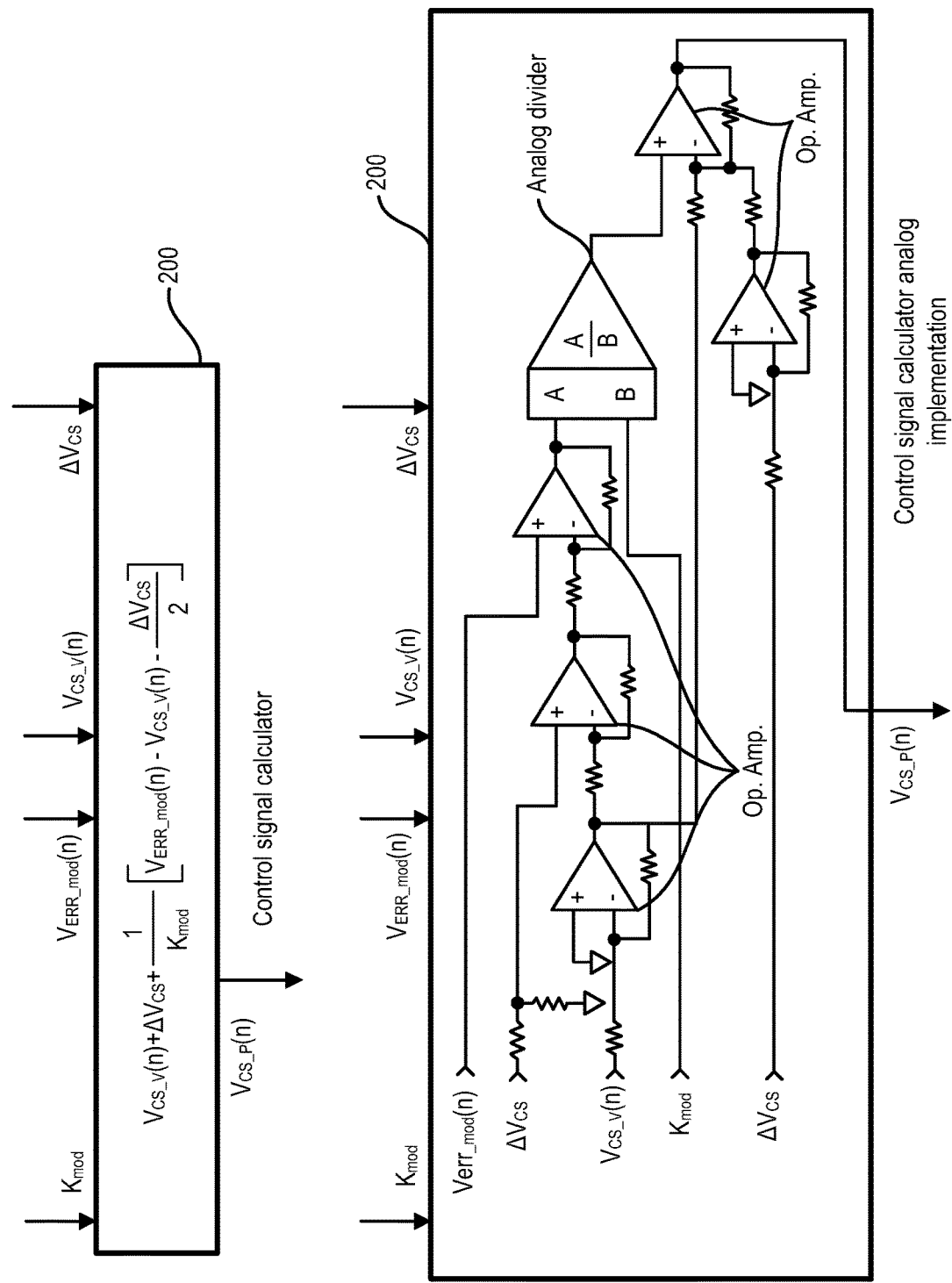
FIG. 12B shows a block diagram implementing a calculation block of FIG. 12A according to various examples of the present disclosure.

Control signal calculator circuit 200 of FIG. 12A generates its output signal $V_{CS\_P}(n)$ as a linear combination of signals: $[V_{CS\_v}(n)+\Delta V_{CS}]$ and $[V_{ERR\_mod}(n)-V_{CS\_v}(n)-\Delta V_{CS}/2]$ with adaptive (calculated for each switching cycle) coefficient $K(n)=1/K_{mod}$. FIG. 12B shows an example of control signal calculator circuit 200 implemented using analog adders, subtractors, and multipliers, though other implementations are possible. Referring again to FIG. 12A, coefficient $K_{mod}$ is generated by a modifying coefficient calculator circuit (shown as CB 201) receiving its two inputs $V_{U\_diff}(n-1)$ and $V_{D\_diff}(n-1)$. The modifying coefficient calculator circuit 201 is a divider having a denominator that is the first input $V_{U\_diff}(n-1)$ of the modifying coefficient calculator circuit 201 and numerator is the sum of the two inputs $[V_{U\_diff}(n-1)+V_{D\_diff}(n-1)]$ of modifying coefficient calculator circuit 201.

The $\Delta V_{CS}$ ($V_{CS}$ ripple) signal is generated by an average current sense signal ripple calculator circuit 203 receiving its two inputs $\Delta V_{CS\_min}(n-1)$, $\Delta V_{CS\_pl}(n-1)$ and generating its output based on Equation (24) below:

$$\Delta V_{CS\_av}(n-1) = \frac{p \Delta V_{CS\_pl}(n-1) + q \Delta V_{CS\_min}(n-1)}{(p+q)} \quad (24)$$

Average current sense signal ripple calculator circuit 203 is an adder with two inputs receiving signals $\Delta V_{CS\_pl}(n-1)$, $\Delta V_{CS\_min}(n-1)$ and summing them up with weights $p/(p+q)$ and $q/(p+q)$. The result of the calculation is used as $\Delta V_{CS}$ and it is iterative, e.g., it is correct for steady-state condition.

The modified error voltage $V_{ERR\_mod}(n)$ signal (see Equation (10)) is generated by error voltage modifier circuit 204, which receives its three input signals ($V_{ERR}(n)$, $K_{mod}$, 'Mode') and generates the modified error voltage $V_{ERR\_mod}(n)$ signal based on Equation (23) and the modifying coefficient calculator circuit 201 described above. Error voltage modifier circuit 204 is a multiplier with two inputs $V_{ERR}(n)$ and $K_{mod}(n)$ and a switch controlled by the mode signal. The output of the multiplier is passed to the output of the error voltage modifier circuit 204 in Boost or Buck-Boost mode. In buck mode, $V_{ERR}$ is not modified (see Equation (10)) and passed to the output of the error voltage modifier circuit 204 directly. The mode of operation is defined by the signal 'Mode'.

The signals $V_{U\_diff}(n-1)$, $V_{D\_diff}(n-1)$, are respectively generated by S&H circuits 213, 214, which receive on their inputs signals $[V_L(t)-V_R(t)]$, $t_{ON}(n-1)$ and $[V_L(t)-V_R(t)]$, $t_{OFF}(n-1)$, respectively, wherein $V_L(t)$ and $V_R(t)$ represent the respective voltages at terminals $V_L$ and $V_R$ of inductor 100 as a function time 't'. S&H circuit 213 is configured to sample signal $[V_L(t)-V_R(t)]$ at the end of time interval $t_{ON}(n-1)$. S&H circuit 214 is configured to sample signal $[V_L(t)-V_R(t)]$ at the end of time interval $t_{OFF}(n-1)$.

The signals $[V_L(t)-V_R(t)]$, $[V_R(t)-V_L(t)]$ are generated by subtractors 215, 216, respectively, which receive signals $V_L(t)$, $V_R(t)$ as inputs.

The $\Delta V_{CS\_pl}(n-1)$, $\Delta V_{CS\_min}(n-1)$ signals are generated by a current sense signal ripple slope calculator circuit, which includes S&H circuits 211, 212, which receive on their inputs signals $[\Delta V_{CS\_U}(n-1), t_{ON}(n-1)]$ and $[\Delta V_{CS\_D}(n-1), t_{OFF}(n-1)]$, respectively. S&H circuit 211 is configured to sample the $\Delta V_{CS\_U}(n-1)$ signal at the end of the $t_{ON}(n-1)$ time interval. S&H circuit 212 is configured to sample the $\Delta V_{CS\_D}(n-1)$ signal at the end of the $t_{OFF}(n-1)$ time interval.

The $\Delta V_{CS\_U}(n-1)$, $\Delta V_{CS\_D}(n-1)$ signals are generated by the subtractor circuits 209, 210, which receive on their non-inverting and inverting inputs signals $[V_{CS\_P}(n-1), V_{CS\_v}(n-1)]$ and $[V_{CS\_P}(n-1), V_{CS\_v}(n)]$, respectively.

The signals $V_{CS\_v}(n-1)$, $V_{CS\_v}(n)$ are generated by 'sample and hold' (S&H) circuit 205, which receives on its inputs current sense signal $V_{CS}(t)$ and signals $t_{OFF}(n-1)$, $t_{OFF}(n-2)$, where $V_{cs}(t)$ represent the current sense signal $V_{cs}$ as a function time S&H circuit 205 is configured to sample the current sense signal $V_{CS}(t)$ at the end of the time intervals $t_{OFF}(n-1)$, $t_{OFF}(n-2)$.

The signal $V_{CS\_P}(n-1)$ is generated by 'sample and hold' (S&H) circuit 206, which receives on its inputs current sense signal $V_{CS}(t)$ and $t_{ON}(n-1)$. S&H circuit 206 is configured to sample the current sense signal $V_{CS}(t)$ at the end of $t_{ON}(n-1)$ period.

Although the IACM control method according to various examples of the present disclosure is implemented using a constant switching frequency in the example of FIG. 12A, the IACM control method could also be implemented with PWMs other than 'constant switching frequency.' For example, a 'constant ON time' (COT) PWM may be used to implement the IACM control method according to various examples of the present disclosure.

In various examples of a COT PWM controller, a control signal defines the duration of the OFF time, so it is 'valley control', rather than 'peak control' as in the previous example.

Figure 13:
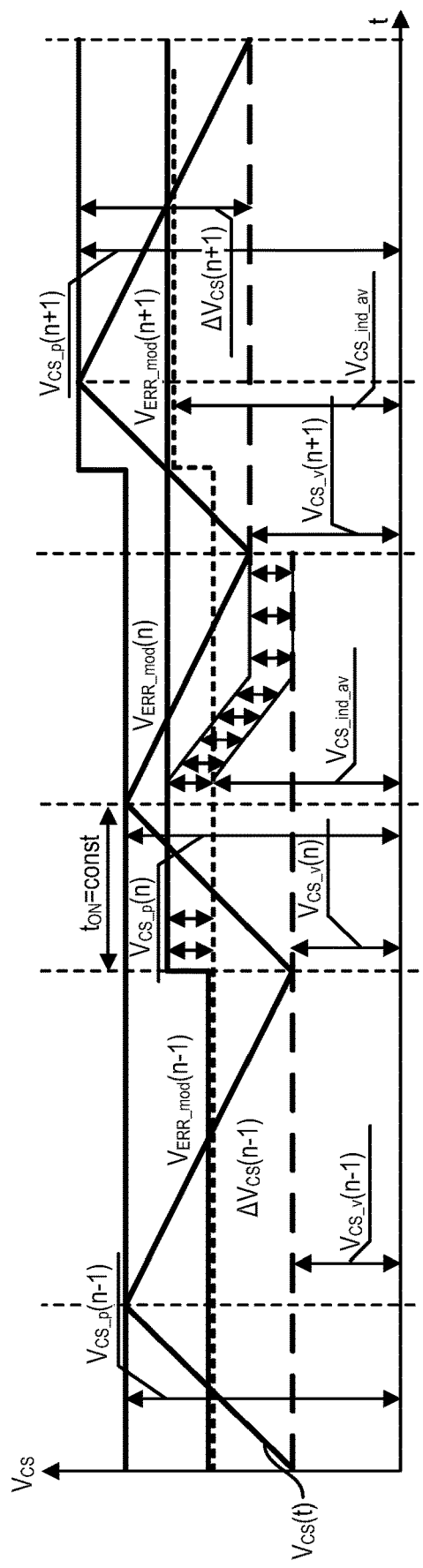
FIG. 13 shows a waveform diagram corresponding to an iterative average current mode (IACM) pulse width modulation (PWM) controller with constant on-time modulation according to various examples of the present disclosure.

FIG. 13 depicts the current sense signal $V_{CS}(t)$ waveform according to various examples, which is steady state up until switching cycle (n) and is in regulation with average value $V_{CS\_av}=V_{ERR\_mod}(n-1)$. The following are modeling assumptions, allowing the derivation of an algorithm for a general case. In the beginning of the present switching cycle (n), the modified error voltage $V_{ERR\_mod}$ changes to a new level: $V_{ERR\_mod}(n)$ and stays at this level until the end of the present switching cycle. To achieve regulation at this new level, a new level of $V_{CS\_v}(n+1)$ can be determined from Equation (25) below:

$$V_{CS\_v}(n+1)=V_{CS\_v}(n)+(V_{ERR\_mod}(n)-V_{ERR\_mod}(n-1)) \quad (25)$$

Assuming that the $V_{CS}$ ripple $\Delta V_{CS}$ remains the same yields Equation (26) below:

$$V_{CS\_av\_ind}(n+1)=V_{ERR\_mod}(n+1) \quad (26)$$

To achieve Equation (25), and taking into consideration Equation (27) below, Equation (28) is provided below:

$$V_{ERR\_mod}(n-1) = V_{CS\_v}(n) + \frac{\Delta V_{CS}}{2} \quad (27)$$

$$V_{CS\_v}(n+1) = V_{ERR\_mod}(n) - \frac{\Delta V_{CS\_U}}{2} \quad (28)$$

In Equation (28), the designation $\Delta V_{CS\_U}$ is used instead of $\Delta V_{CS}$ to reflect the fact that with $t_{ON}$=constant, steady-state $V_{CS}$ ripple is equal to its upslope.

Figure 14:
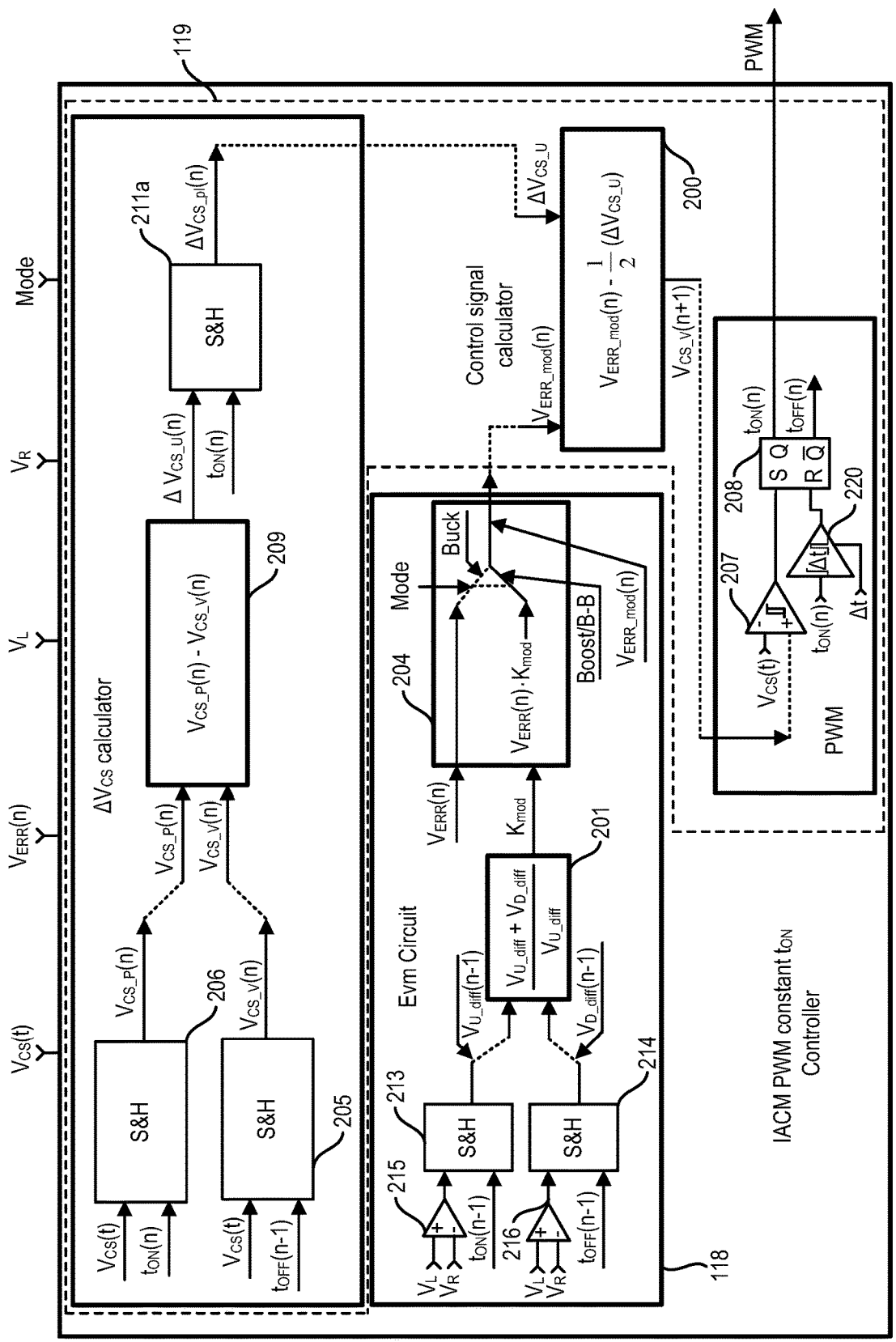
FIG. 14 shows a block diagram of an iterative average current mode (IACM) pulse width modulation (PWM) controller with constant on-time modulation according to various examples of the present disclosure.

The PWM controller of FIG. 14 is an example of an iterative average current mode control method operating in a constant on-time (torr) mode. Referring to FIG. 14, which is an example of the PWM controller 111a of FIG. 3A, the signal $V_{CS\_v}(n+1)$ on the output of control signal calculator circuit 200 is compared to the current sense signal $V_{CS}(t)$ by comparator 207, illustrated as provided with hysteresis. On the condition $V_{CS}(t)<V_{CS\_v}(n+1)$ the output signal of the comparator 207 sets the flip-flop circuit 208, terminating the OFF time of the switching cycle (n), and setting the PWM signal to the first state. Flip-flop circuit 208 is reset by the output of one-shot circuit 220, which starts the OFF time of the next switching cycle (n+1), and sets the PWM signal to the second state. One-shot circuit 220 receives on its input signal $t_{ON}(n)$ and programming signal Δt defining the duration of torr.

Control signal calculator circuit 200 generates its output signal $V_{CS\_v}(n+1)$ as a difference of signals: $V_{ERR\_mod}(n)$ and $(\Delta V_{CS\_U})/2]$. The modified error voltage signal $V_{ERR\_mod}(n)$ (see Equation (10)) is generated by error voltage modifier circuit 204 which is based on Equation (23) and receives its three input signals ($V_{ERR}(n)$, $K_{mod}$, 'Mode'), of which input signal $K_{mod}$ is provided by the modifying coefficient calculator circuit 201 described above. Error voltage modifier circuit 204 is a multiplier with two inputs $V_{ERR}(n)$ and $K_{mod}(n)$. The output of the multiplier is passed to the output of the error voltage modifier circuit 204 in Boost or Buck-Boost mode. In buck mode, the voltage error signal $V_{ERR}$ is not modified (see Equation (10)) and is passed to the output of the error voltage modifier circuit 204 directly. The mode of operation is defined by signal 'Mode'. Although the error voltage modifier circuit 204 in the example shown in FIG. 14 provides a different output based on the mode signal it receives, various examples of the error voltage modifier circuit 204 include single mode operation.

The signals $V_{U\_diff}(n-1)$, $V_{D\_diff}(n-1)$, are generated by S&H circuits 213, 214, which receive on their inputs signals $[V_L(t)-V_R(t)]$, $t_{ON}(n-1)$ and $[V_L(t)-V_R(t)]$, $t_{OFF}(n-1)$, respectively. S&H circuit 213 is configured to sample signal $[V_L(t)-V_R(t)]$ at the end of time interval $t_{ON}(n-1)$. S&H circuit 214 is configured to sample signal $[V_L(t)-V_R(t)]$ at the end of time interval $t_{OFF}(n-1)$.

The signals $[V_L(t)-V_R(t)]$, $[V_L(t)-V_R(t)]$ are respectively generated by subtractor circuits 215, 216, which receive signals $V_L(t)$, $V_R(t)$ as inputs.

The signal $\Delta V_{CS\_U}$ ($V_{CS}$ upslope) is generated by a current sense signal ripple upslope calculator circuit 211a, which includes a S&H circuit which outputs signal $\Delta V_{CS\_pl}(n)$ and receives on its inputs signals $[\Delta V_{CS\_U}(n), t_{ON}(n)]$. Current sense signal ripple upslope calculator circuit 211a is configured to sample the $\Delta V_{CS\_U}(n)$ signal at the end of the $t_{ON}(n)$ time interval so as to output signal $\Delta V_{CS\_pl}(n)$. Therefore, although the input to control signal calculator circuit 200 is shown in FIG. 14 as $\Delta V_{CS\_U}$ and the output of the current sense signal ripple upslope calculator circuit 211a is shown as $\Delta V_{CS\_pl}(n)$, $\Delta V_{CS\_pl}(n)$ represents a sampling of $\Delta V_{CS\_U}$ that remains unchanged for the next cycle.

The $\Delta V_{CS\_U}(n)$ signal is generated by the subtractor circuit 209, which receives on its non-inverting and inverting inputs signals $[V_{CS\_P}(n), V_{CS\_v}(n)]$, respectively.

The signal $V_{CS\_v}(n)$ is generated by 'sample and hold' (S&H) circuit 205, which receives on its inputs current sense signal $V_{CS}(t)$ and signal $t_{OFF}(n-1)$. S&H circuit 205 is configured to sample the current sense signal $V_{CS}(t)$ at the end of the time interval $t_{OFF}(n-1)$.

The signal $V_{CS\_P}(n)$ is generated by 'sample and hold' (S&H) circuit 206, which receives on its inputs signal current sense signal $V_{CS}(t)$ and $t_{ON}(n)$. S&H circuit 206 is configured to sample the current sense signal $V_{CS}(t)$ at the end of the current time interval $t_{ON}(n)$.

Various examples of the present disclosure may also include a 'constant OFF time' PWM controller, in which case a control signal defines the duration of the ON time, so it is 'peak control', rather than 'valley control' as in the case with a constant switching frequency example.

Figure 15:
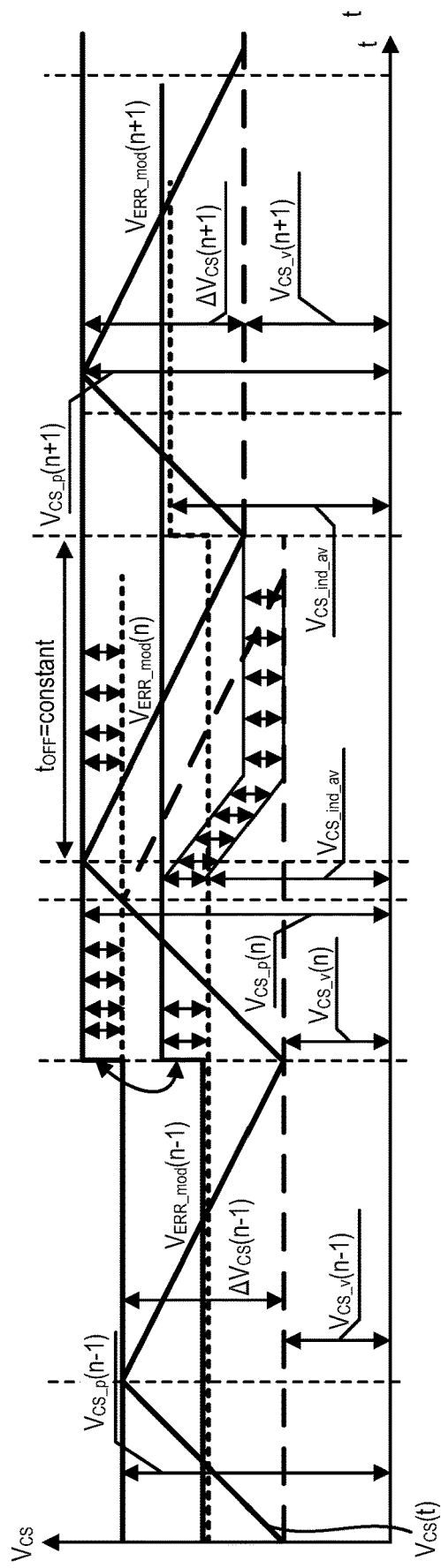
FIG. 15 shows a waveform diagram corresponding to an iterative average current mode (IACM) pulse width modulation (PWM) controller with constant off-time modulation according to various examples of the present disclosure.

FIG. 15 depicts a current sense signal $V_{CS}(t)$ waveform according to various examples of the present disclosure, which is steady state up until switching cycle (n) and is in regulation with average value $V_{CS\_av}=V_{ERR\_mod}(n-1)$. The following are modeling assumptions, allowing the derivation of an algorithm for a general case. In the beginning of the present switching cycle (n) the modified error voltage $V_{ERR\_mod}$ changes to a new level: $V_{ERR\_mod}(n)$ and stays at this level until the end of the present switching cycle. To achieve regulation at this new level, a new level of $V_{CS\_p}(n)$ can be determined by Equation (29) below:

$$V_{CS\_p}(n)=V_{CS\_p}(n-1)+(V_{ERR\_mod}(n)-V_{ERR\_mod}(n-1)) \quad (29)$$

Equation (29) is based on the assumption that the $V_{CS}$ ripple $\Delta V_{CS}$ remains the same and therefore yields Equation 30 below:

$$V_{CS\_av\_ind}(n+1)=V_{ERR\_mod}(n+1) \quad (30)$$

To achieve Equation (29), and taking into consideration Equation (31) below, Equation (32) states as follows:

$$V_{ERR\_mod}(n-1) = V_{CS\_P}(n-1) - \frac{\Delta V_{CS\_D}}{2} \quad (31)$$

$$V_{CS\_P}(n) = V_{ERR\_mod}(n) + \frac{\Delta V_{CS\_D}}{2} \quad (32)$$

In Equation (28), the designation $\Delta V_{CS\_D}$ is used instead of $\Delta V_{CS}$ to reflect the fact that with $t_{OFF}$=constant, steady-state $V_{CS}$ ripple is equal to its downslope.

Figure 16:
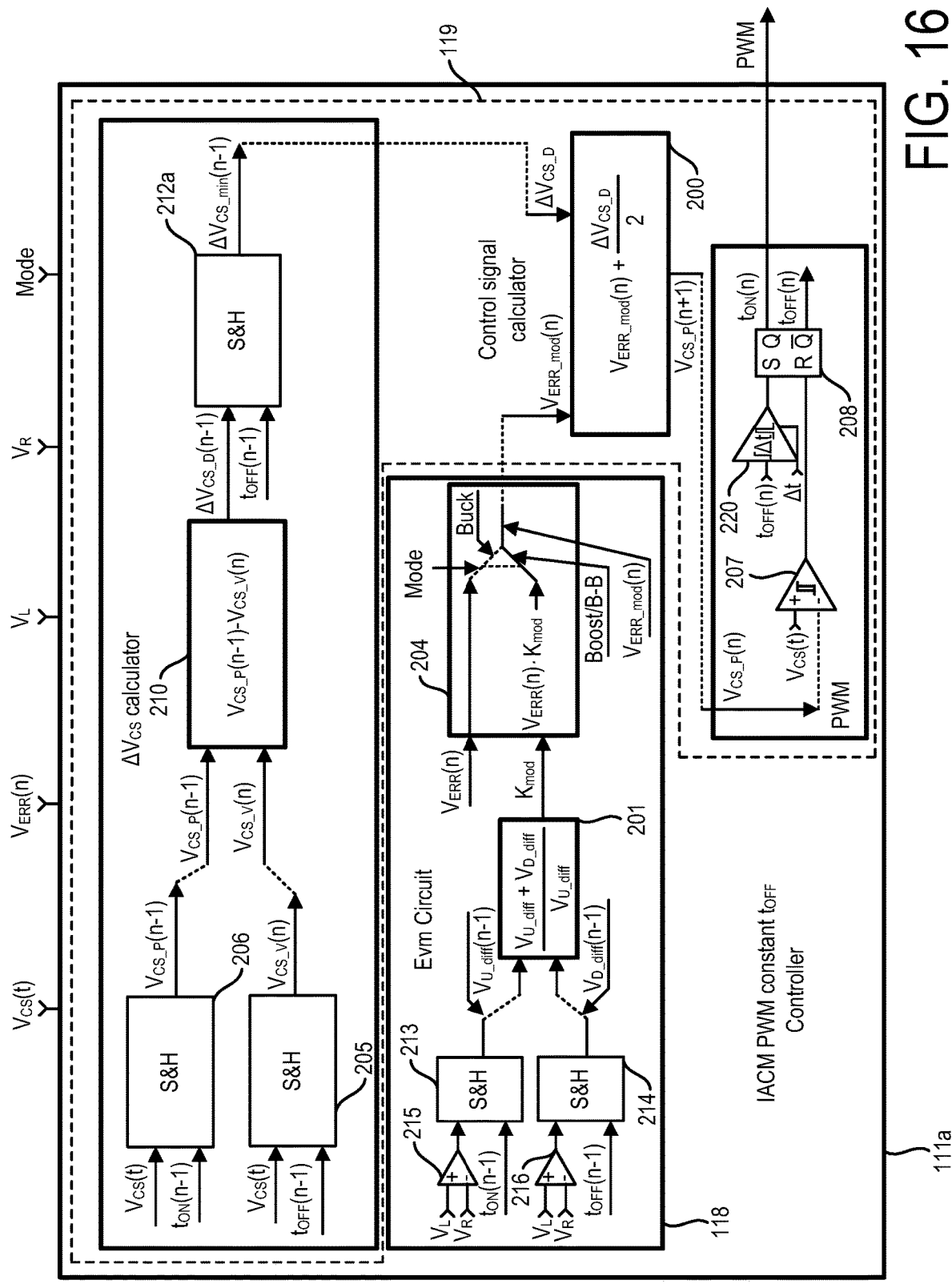
FIG. 16 shows a block diagram of an iterative average current mode (IACM) pulse width modulation (PWM) controller with constant off-time modulation according to various examples of the present disclosure.

The PWM controller of FIG. 16 is an example of an iterative average current mode control method operating in a constant off time ($t_{OFF}$) mode. Referring to FIG. 16, which is an example of the PWM controller 111a of FIG. 3A, the signal $V_{CS\_P}(n)$ on the output of control signal calculator circuit 200 is compared to signal $V_{CS}(t)$ by comparator 207. On the condition $V_{CS}(t) > V_{CS\_P}(n)$ the output signal of the comparator 207 resets the flip-flop circuit 208, terminating the ON time of the switching cycle (n), and setting the PWM signal to the second state. Flip-flop circuit 208 is set by the output of the one-shot circuit 220, which starts the ON time of the next switching cycle (n+1), and sets the PWM signal to the first state. One-shot circuit 220 receives on its input signal $t_{OFF}(n)$ and programming signal $\Delta t$ defining the duration of $t_{OFF}$.

Control signal calculator circuit 200 generates its output signal $V_{CS\_P}(n+1)$ as the sum of two voltages: $V_{ERR\_mod}(n)$ and $(\Delta V_{CS\_D})/2]$.

The modified error voltage signal $V_{ERR\_mod}(n)$ (see Equation (10)) is generated by the error voltage modifier circuit 204, which receives its three input signals ($V_{ERR}(n)$, $K_{mod}$, 'Mode') and is based on Equation (23) and the modifying coefficient calculator circuit 201 described above. Error voltage modifier circuit 204 is a multiplier with two inputs $V_{ERR}(n)$ and $K_{mod}(n)$. The output of the multiplier is passed to the output of error voltage modifier circuit 204 in Boost or Buck-Boost mode. In buck mode, the voltage error signal $V_{ERR}$ is not modified (see Equation (10)) and is passed to the output of the error voltage modifier circuit 204 directly. The mode of operation is defined by signal 'Mode'. Although the error voltage modifier circuit 204 in the example shown in FIG. 16 provides a different output based on the mode signal it receives, various examples of the error voltage modifier circuit 204 include single mode operation.

The signals $V_{U\_diff}(n-1)$, $V_{D\_diff}(n-1)$, are generated by S&H circuits 213, 214, which receive on their inputs signals $[V_L(t)-V_R(t)]$, $t_{ON}(n-1)$ and $[V_L(t)-V_R(t)]$, $t_{OFF}(n-1)$, respectively. S&H circuit 213 is configured to sample signal $[V_L(t)-V_R(t)]$ at the end of time interval $t_{ON}(n-1)$. S&H circuit 214 is configured to sample signal $[V_L(t)-V_R(t)]$ at the end of time interval $t_{OFF}(n-1)$.

The signals $[V_L(t)-V_R(t)]$, $[V_L(t)-V_R(t)]$ are respectively generated by subtractor circuits 215, 216, which receive signals $V_L(t)$, $V_R(t)$ as inputs.

The PWM controller of FIG. 16 includes a current sense signal ripple down-slope calculator circuit 212a configured to generate a signal $\Delta V_{CS\_D}$ ($V_{CS}$ downslope). More specifically, $\Delta V_{CS\_D}$ is generated by the current sense signal ripple down-slope calculator circuit 212a, which includes a S&H circuit that passes as its output signal $\Delta V_{CS\_min}(n-1)$ and receives on its inputs signals $[\Delta V_{CS\_D}(n-1), t_{OFF}(n-1)]$. S&H circuit 212 is configured to sample the $\Delta V_{CS\_D}(n-1)$ signal at the end of the $t_{OFF}(n-1)$ time interval. Therefore, although the input to control signal calculator circuit 200 is shown in FIG. 16 as $\Delta V_{CS\_D}$ and the output of the current sense signal ripple down-slope calculator circuit 212a is shown as $\Delta V_{CS\_min}(n)$, $\Delta V_{CS\_min}(n)$ represents a sampling of $\Delta V_{CS\_D}$ that remains unchanged for the next cycle.

The $\Delta V_{CS\_D}(n-1)$ signal is generated by the subtractor circuit 210, which receives on its non-inverting and inverting inputs signals $[V_{CS\_P}(n-1), V_{CS\_V}(n)]$, respectively.

The signal $V_{CS\_V}(n)$ is generated by 'sample and hold' (S&H) circuit 205, which receives on its inputs the current sense signal $V_{CS}(t)$ and signal $t_{OFF}(n-1)$. S&H circuit 205 is configured to sample the current sense signal $V_{CS}(t)$ at the end of the time interval $t_{OFF}(n-1)$.

The signal $V_{CS\_P}(n-1)$ is generated by 'sample and hold' (S&H) circuit 206, which receives on its inputs signal $V_{CS}(t)$ and $t_{ON}(n-1)$. S&H circuit 206 is configured to sample the current sense signal $V_{CS}(t)$ at the end of the $t_{ON}(n-1)$ signal.

According to various examples of the present disclosure, IACM control mode may be implemented using a PWM controller 111a operating in a 'constant ripple' mode. In the case of 'constant ripple' mode, the moments of turning the switch ON and OFF are defined by the current sense signal $V_{CS}(t)$ as it increases after crossing the signal $V_{ERR\_mod}(n)$ at the moment when $V_{CS}(t) > V_{ERR\_mod}(n)$ by a predetermined value $(\frac{1}{2})\Delta V_{CS}$ or as it decreases after crossing the signal $V_{ERR\_mod}(n)$ at the moment when $V_{CS}(t) < V_{ERR\_mod}(n)$ by the same predetermined value $(\frac{1}{2})\Delta V_{CS}$.

Figure 17:
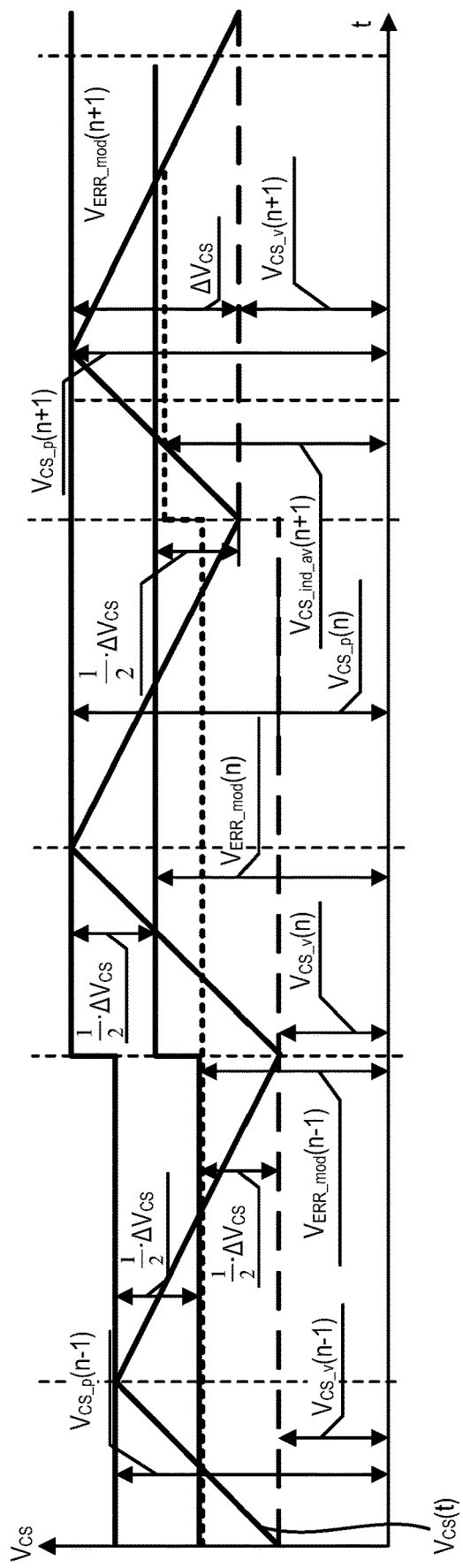
FIG. 17 shows a waveform diagram corresponding to an iterative average current mode (IACM) pulse width modulation (PWM) controller with constant ripple modulation according to various examples of the present disclosure.

FIG. 17 depicts current sense signal $V_{CS}(t)$ waveform according to various examples of the present disclosure, which is steady state up until switching cycle (n) and is regulated with average value $V_{CS\_av}=V_{ERR\_mod}(n-1)$. In the beginning of the present switching cycle (n), the modified error voltage $V_{ERR\_mod}$ jumps to a new level: $V_{ERR\_mod}(n)$ and stays at this level to the end of the present switching cycle. As the current sense signal $V_{CS}(t)$ increases in the present cycle (n), it crosses the new level of $V_{ERR\_mod}(n)$ and after that keeps increasing until reaching the level of $[V_{ERR\_mod}(n)+(\frac{1}{2})\Delta V_{CS}]$. At this moment, the state 'ON' changes to 'OFF', responsive to current sense signal $V_{CS}(t)$ being greater than $[V_{ERR\_mod}(n)+(\frac{1}{2})\Delta V_{CS}]$, and the current sense signal $V_{CS}(t)$ starts decreasing. The current sense signal $V_{CS}(t)$ continues decreasing past the modified error voltage $V_{ERR\_mod}(n)$ and keeps decreasing until it reaches the level $[V_{ERR\_mod}(n)-(\frac{1}{2})\Delta V_{CS}]$. At this moment, responsive to current sense signal $V_{CS}(t)$ being less than $[V_{ERR\_mod}(n)-(\frac{1}{2})\Delta V_{CS}]$ the state changes from 'OFF' to 'ON' and the next switching period starts. $V_{ERR+mod}(n)$ starting from cycle (n+1) is a new average value of $V_{CS}(t)$ and the transient to a new average took one switching cycle.

As would be understood by those skilled in the art, there are multiple ways of implementing the described regulation algorithm. A block diagram with one of possible implementation of IACM control in a constant ripple mode is presented in FIG. 18.

Figure 18:
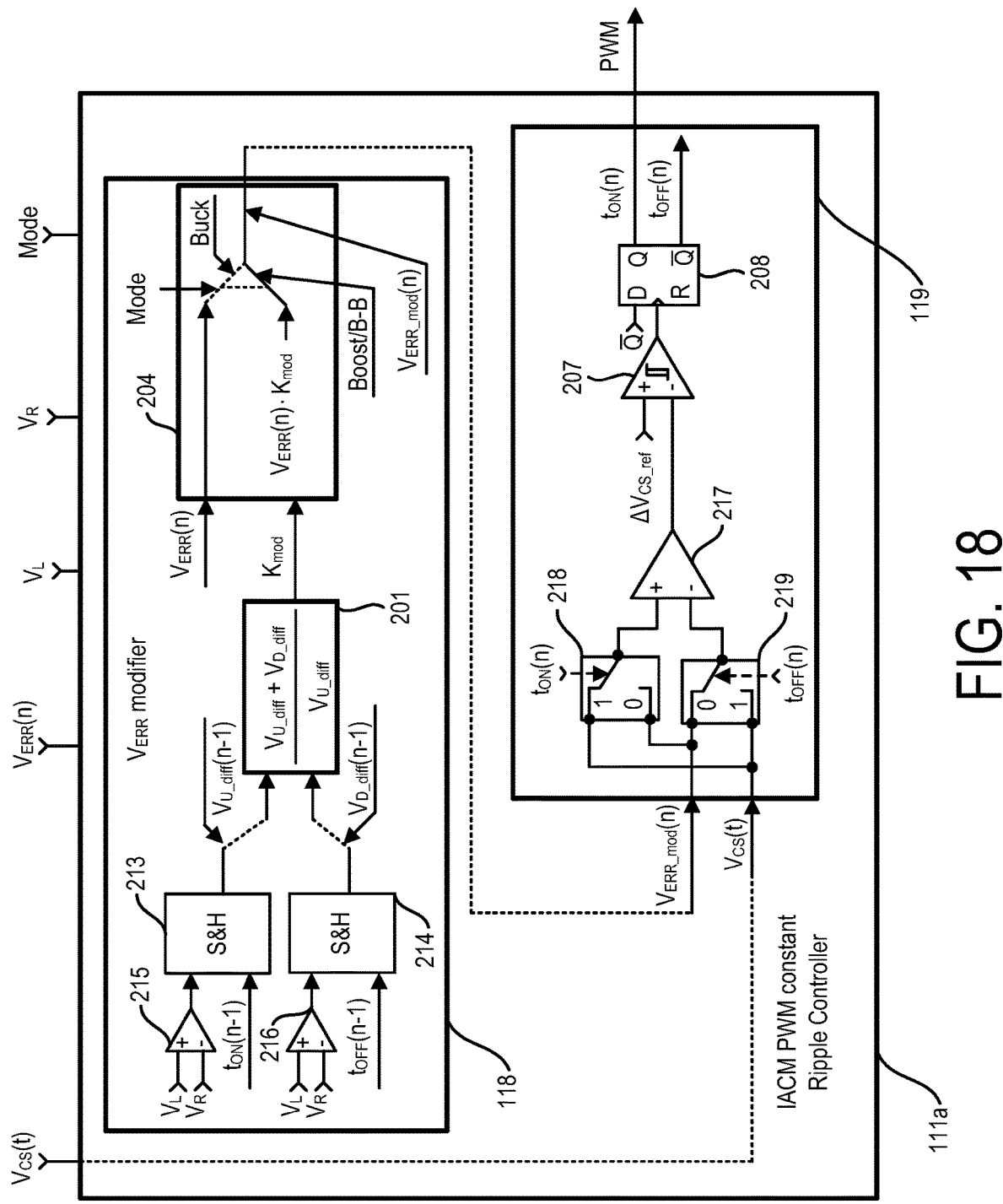
FIG. 18 shows a block diagram of an iterative average current mode (IACM) pulse width modulation (PWM) controller with constant ripple modulation according to various examples of the present disclosure.

In FIG. 18, the PWM signal is generated by toggle flip flop circuit 208, which receives on its D input signal $t_{OFF}(n)$ (inverted Q) and on its dynamic, or clock, input the output of comparator 207. The comparator 207 receives on its noninverting input signal $\Delta V_{CS\_ref}$—a preprogrammed value of $V_{CS}$ ripple, and on its inverting input the output of a subtractor circuit, shown as differential amplifier 217. The differential amplifier 217 receives on its inverting and non-inverting inputs the outputs of commutators (218, 219), respectively. Commutators (218, 219) receive on their respective control inputs the outputs of toggle flip flop circuit 208 $t_{ON}(n)$ and $t_{OFF}(n)$ and on its 'information' inputs current sense signal $V_{CS}(t)$ and modified error voltage signal $V_{ERR\_mod}(n)$. Commutators (218, 219) pass to its respective output connected to noninverting input of differential amplifier 217 signal $V_{CS}(t)$ and to its respective output connected to inverting input of differential amplifier 217 signal $V_{ERR\_mod}(n)$ if digital signals $t_{ON}(n)=1$ and $t_{OFF}(n)=0$. If $t_{ON}(n)=0$ and $t_{OFF}(n)=1$, $V_{CS}(t)$ is passed to the inverting input of 217 and $V_{ERR\_mod}(n)$ to the noninverting input of 217.

The modified error voltage signal $V_{ERR\_mod}(n)$ (see Equation (10)) is generated by error voltage modifier circuit 204, which receives its three input signals ($V_{ERR}(n)$, $K_{mod}$, 'Mode') and is based on Equation (23) and modifying coefficient calculator circuit 201 described above. The error voltage modifier circuit 204 comprises a multiplier with two inputs $V_{ERR}(n)$ and $K_{mod}(n)$. The output of multiplier is passed to the output of the error voltage modifier circuit 204 in Boost or Buck-Boost mode. In buck mode, $V_{ERR}$ is not modified (see Equation (10)) and is passed to the output of the error voltage modifier circuit 204 directly. The mode of operation is defined by signal 'Mode'. Although the error voltage modifier circuit 204 in the example shown in FIG. 18 provides a different output based on the mode signal it receives, various examples of the error voltage modifier circuit 204 include single mode operation.

Various examples have been disclosed herein, in connection with the above description and the drawings. It will be understood that it would be unduly repetitious to literally describe and illustrate every combination and subcombination of these examples. Accordingly, all examples can be combined in any way and/or combination, and the present specification, including the drawings, shall be construed to constitute a complete written description of all combinations and subcombinations of the examples described herein, and of the manner and process of making and using them, and shall support claims to any such combination or subcombination.

It will be appreciated by persons skilled in the art that the examples described herein are not limited to what has been particularly shown and described herein above. In addition, unless mention was made above to the contrary, it should be noted that all of the accompanying drawings are not to scale. A variety of modifications and variations are possible in light of the above teachings.

What is claimed is:

1. A converter configured to receive a DC input voltage and provide a DC output voltage, the converter comprising:
   an inductor having a first terminal and a second terminal;
   a first controlled switch, a second controlled switch, and a third controlled switch, each having a respective control terminal, a first terminal and a second terminal; wherein the second terminal of the first controlled switch and the first terminal of the second controlled switch are coupled to the first terminal of the inductor, the first terminal of the third controlled switch is coupled to the second terminal of the inductor, the first terminal of the first controlled switch is coupled to the DC voltage input, and the second terminals of the second and third control switches are coupled to a common terminal;
   a rectifier device having a second terminal coupled to the second terminal of the inductor and a first terminal configured to provide the DC output voltage;
   a current sense amplifier configured to output a current sense signal over a present switching cycle based on an inductor current through the inductor;
   a voltage error amplifier configured to output an error voltage based on a difference between a reference voltage and a representation of the DC output voltage;
   a pulse width modulation (PWM) controller comprising:
      an error voltage modifier circuit configured to receive the error voltage and a mode signal, and selectively output the error voltage, or a modified error voltage corresponding to a product of the error voltage and a modifying coefficient, based on the mode signal; and
      an iterative average current control circuit configured to receive the current sense signal and the output from the error voltage modifier circuit, and to generate a pulse width modulation (PWM) signal based on the current sense signal over the present switching cycle and the current sense signal over a previous switching cycle that precedes the present switching cycle, and
   a logic drivers control block configured to receive the PWM signal, output the mode signal based on the DC input voltage and the DC output voltage, and output control signals configured to drive the first, second, and third controlled switches, via their respective control terminals, based on the PWM signal.

2. The converter of claim 1, wherein the PWM controller is configured for a constant switching frequency mode and comprises:
   a current sense signal ripple slope calculator circuit configured to output signals corresponding to an upslope and downslope, respectively, of the current sense signal over the previous switching cycle;
   an average current sense signal ripple calculator circuit configured to receive the output signals of the current sense signal ripple slope calculator circuit and output a signal representing an average change in the current sense signal over the previous switching cycle;
   a control signal calculator circuit configured to output a signal representing a peak current sense signal over the present switching cycle based on the output of the error voltage modifier circuit and the output signal of the average current sense signal ripple calculator circuit;
   a comparator having a non-inverting input configured to receive the current sense signal and an inverting input configured to receive the output of the control signal calculator circuit; and
   a flip-flop circuit having a non-inverting output configured to generate the PWM signal, a first input configured to receive a clock signal and set the PWM signal to a first state, and a second input configured to receive the output of the comparator and set the PWM signal to a second state.

3. The converter of claim 1, comprising a current sense signal ripple upslope calculator circuit configured to output a signal corresponding to an upslope of the current sense signal;
   wherein the PWM controller is configured for a constant on-time mode and comprises:
      a control signal calculator circuit configured to subtract half the output of the current sense signal ripple upslope calculator circuit from the output of the error voltage modifier circuit, and output the resulting difference;
      a comparator having an inverting input configured to receive the current sense signal and a non-inverting input configured to receive the output of the control signal calculator circuit, and an output configured to output a signal based on a comparison of the non-inverting and inverting inputs; and
      a flip-flop circuit having a non-inverting output configured to generate the PWM signal, a first input configured to receive the output of the comparator and set the non-inverting output to a first state, and a second input configured to receive the output of a one-shot circuit configured generate an output pulse and set the non-inverting output to a second state;

wherein the one-shot circuit includes a triggering input configured to receive the non-inverting output of the flip-flop circuit.

4. The converter of claim 1, comprising a current sense signal ripple down-slope calculator circuit configured to output a signal corresponding to a downslope of the current sense signal;

wherein the PWM controller is configured for a constant off time mode and comprises:

a control signal calculator circuit configured to add half the output of the ripple down-slope calculator circuit and the output of the error voltage modifier circuit, and output the resulting sum;

a comparator having a non-inverting input configured to receive the current sense signal, an inverting input configured to receive the output of the control signal calculator circuit, and an output configured to output a signal based on a comparison of the non-inverting and inverting inputs;

a one-shot circuit configured to generate an output pulse;

a flip-flop circuit having a non-inverting output configured to generate the PWM signal, an inverting output configured to generate an inverted signal of the non-inverting output, a first input configured to receive an output voltage of the one-shot circuit and set the non-inverting output to a first signal state, and a second input configured to receive the output of the comparator and set the non-inverting output to a second signal state;

wherein the one-shot circuit includes a triggering input configured to receive the output of the inverting output of the flip-flop circuit.

5. The converter of claim 1, wherein the PWM controller is configured for a constant ripple mode and comprises:

a subtractor circuit having a non-inverting input configured to receive the current sense signal and an inverting input configured to receive the output of the error voltage modifier circuit during a first time interval, whereas during a second time interval the non-inverting input is configured to receive the output of the error voltage modifier circuit and the inverting input is configured to receive the current sense signal;

a comparator having a non-inverting input configured to receive a reference voltage, an inverting input configured to receive an output of the subtractor circuit, and an output configured to output a signal based on a comparison of the non-inverting and inverting inputs of the comparator; and a toggle flip-flop circuit having a non-inverting output configured to generate the PWM signal, and a dynamic input configured to receive the output of the comparator.

6. The converter of claim 1, wherein the PWM signal includes a first signal state during a first time interval and a second signal state, different from the first signal state, during a second time interval, said converter further comprising:

a modifying coefficient calculator circuit configured to receive a voltage across the inductor during the first time interval and a voltage across the inductor during the second time interval, and output the modifying coefficient, which modifying coefficient corresponds to a ratio of the sum of the voltages across the inductor during the first time interval plus the second time interval, and the voltage across the inductor during the first time interval.

7. The converter of claim 1, wherein the error voltage modifier circuit is configured to output the error voltage in response to the mode signal indicating a buck mode, and output the modified error voltage in response to the mode signal indicating a boost mode or a buck-boost mode.

8. A buck converter configured to receive a DC input voltage and provide a DC output voltage, the buck converter comprising:

an inductor having a first terminal and a second terminal;

a first controlled switch and a second controlled switch, each having a respective control terminal, a first terminal and a second terminal, wherein the second terminal of the first controlled switch and the first terminal of the second controlled switch are coupled to the first terminal of the inductor, the first terminal of the first controlled switch is coupled to the DC voltage input, and the second terminal of the second control switch is coupled to a common terminal;

a rectifier device having a second terminal coupled to the second terminal of the inductor, and a first terminal configured to provide the DC output voltage;

a current sense amplifier configured to output a current sense signal over a present switching cycle based on an inductor current through the inductor;

a voltage error amplifier configured to output an error voltage based on a difference between a reference voltage and a representation of the DC output voltage; and a pulse width modulation (PWM) controller comprising:

an iterative average current control circuit configured to receive the current sense signal over the present switching cycle and the error voltage, and to generate a pulse width modulation (PWM) signal for the present switching cycle based on the current sense signal for the present switching cycle and a current sense signal over a previous switching cycle that precedes the present switching cycle;

wherein the buck converter further comprises a logic drivers control block configured to receive the PWM signal, and output control signals configured to drive the first and second controlled switches, via their respective control terminals, based on the PWM signal.

9. The buck converter of claim 8, wherein the PWM controller is configured for a constant switching frequency mode and further comprises:

a current sense signal ripple slope calculator circuit configured to output signals corresponding to an upslope and downslope, respectively, of the current sense signal over the previous switching cycle;

an average current sense signal ripple calculator circuit configured to receive the output signals of the current sense signal ripple slope calculator circuit and output a signal representing an average change in the current sense signal over the previous switching cycle;

a control signal calculator circuit configured to output a signal representing a peak current sense signal over the present switching cycle based on the error voltage and the output signal of the average current sense signal ripple calculator circuit;

a comparator having a non-inverting input configured to receive the current sense signal and an inverting input configured to receive the output of the control signal calculator circuit; and a flip-flop circuit having a non-inverting output configured to generate the PWM signal for the present switching cycle, a first input configured to receive a clock signal and set the PWM signal to a first state, and a second input configured to receive the output of the comparator and set the PWM signal to a second state.

10. The buck converter of claim 8, comprising a current sense signal ripple upslope calculator circuit configured to output a signal corresponding to an upslope of the current sense signal;
wherein the PWM controller is configured for a constant on-time mode and comprises:
a control signal calculator circuit configured to subtract half the output of the current sense signal ripple upslope calculator circuit from the error voltage, and output the resulting difference;
a comparator having an inverting input configured to receive the current sense signal and a non-inverting input configured to receive the output of the control signal calculator circuit; and
a flip-flop circuit having a non-inverting output configured to generate the PWM signal for the present switching cycle, a first input configured to receive the output of the comparator and set the non-inverting output to a first state, and a second input configured to receive the output of a one-shot circuit configured generate an output pulse and set the non-inverting output to a second state;
wherein the one-shot circuit includes a triggering input configured to receive the output of the non-inverting output of the flip-flop circuit.

11. The buck converter of claim 8, comprising a current sense signal ripple down-slope calculator circuit configured to output a signal corresponding to a downslope of the current sense signal;
wherein the PWM controller is configured for a constant off time mode and comprises:
a control signal calculator circuit configured to add half the output of the ripple down-slope calculator circuit and the error voltage, and output the resulting sum;
a comparator having a non-inverting input configured to receive the current sense signal, an inverting input configured to receive the output of the control signal calculator circuit, and an output configured to output a signal based on a comparison of the non-inverting and inverting inputs;
a one-shot circuit configured to generate an output pulse;
a flip-flop circuit having a non-inverting output configured to generate the PWM signal for the present switching cycle, an inverting output configured to generate an inverted signal of the non-inverting output, a first input configured to receive an output voltage of the one-shot circuit and set the non-inverting output to a first signal state, and a second input configured to receive the output of the comparator and set the non-inverting output to a second signal state;
wherein the one-shot circuit includes a triggering input configured to receive the output of the inverting output of the flip-flop circuit.

12. The buck converter of claim 8, wherein the PWM controller is configured for a constant ripple mode and further comprises:
a subtractor circuit having a non-inverting input configured to receive the current sense signal and an inverting input configured to receive the error voltage during a first time interval, whereas during a second time interval the non-inverting input is configured to receive the error voltage and the inverting input is configured to receive the current sense signal;
a comparator having a non-inverting input configured to receive a reference voltage, an inverting input configured to receive an output of the subtractor circuit, and an output configured to output a signal based on a comparison of the non-inverting and inverting inputs of the comparator; and
a toggle flip-flop circuit having a non-inverting output configured to generate the PWM signal for the present switching cycle, and a dynamic input configured to receive the output of the comparator.

13. A boost converter configured to receive a DC input voltage and provide a DC output voltage, the boost converter comprising:
an inductor having a first terminal and a second terminal, said first terminal coupled to the DC input voltage;
a controlled switch having a control terminal, a first terminal and a second terminal;
wherein the second terminal of the controlled switch is coupled to a common terminal, and the first terminal of the controlled switch is coupled to the second terminal of the inductor;
a rectifier device having a second terminal coupled to the second terminal of the inductor, and a first terminal configured to provide the DC output voltage;
a current sense amplifier configured to output a current sense signal over a present switching cycle based on an inductor current through the inductor;
a voltage error amplifier configured to output an error voltage based on a difference between a reference voltage and a representation of the DC output voltage;
a pulse width modulation (PWM) controller comprising:
an error voltage modifier circuit configured to receive the error voltage, and output a modified error voltage corresponding to a product of the error voltage and a modifying coefficient; and
an iterative average current control circuit configured to receive the current sense signal and the modified error voltage, and to generate a pulse width modulation (PWM) signal based on the current sense signal over the present switching cycle and a current sense signal over a previous switching cycle that precedes the present switching cycle;
a logic drivers control block configured to receive the PWM signal, output the mode signal based on the DC input voltage and the DC output voltage, and output one or more control signals configured to drive the controlled switch, via its control terminal, based on the PWM signal.

14. The boost converter of claim 13, wherein the PWM controller is configured for a constant switching frequency mode and comprises:
a current sense signal ripple slope calculator circuit configured to output signals corresponding to an upslope and downslope, respectively, of the current sense signal over the previous switching cycle;
an average current sense signal ripple calculator circuit configured to receive the output signals of the current sense signal ripple slope calculator circuit and output a signal representing an average change in the current sense signal over the previous switching cycle;
a control signal calculator circuit configured to output a signal representing a peak current sense signal over the present switching cycle based on the modified error voltage and the output signal of the average current sense signal ripple calculator circuit;
a comparator having a non-inverting input configured to receive the current sense signal and an inverting input configured to receive the output of the control signal calculator circuit; and
a flip-flop circuit having a non-inverting output configured to generate the PWM signal, a first input configured to receive a clock signal and set the PWM signal to a first state, and a second input configured to receive the output of the comparator and set the PWM signal to a second state.

15. The boost converter of claim 13, further comprising a current sense signal ripple upslope calculator circuit configured to output a signal corresponding to an upslope of the current sense signal;
wherein the PWM controller is configured for a constant on-time mode and further comprises:
a control signal calculator circuit configured to subtract half the output of the current sense signal ripple upslope calculator circuit from the modified error voltage, and output the resulting difference
a comparator having an inverting input configured to receive the current sense signal and a non-inverting input configured to receive the output of the control signal calculator circuit, and an output configured to output a signal based on a comparison of the non-inverting and inverting inputs;
a one-shot circuit configured generate an output pulse; and
a flip-flop circuit having a non-inverting output configured to generate the PWM signal, an inverting output configured to generate an inverted signal of the non-inverting output, a first input configured to receive the output of the comparator and set the non-inverting output to a second signal state, and a second input configured to receive an output voltage of the one-shot circuit and set the non-inverting output to a first signal state;
wherein the one-shot circuit includes a triggering input configured to receive the output of the non-inverting output of the flip-flop circuit.

16. The boost converter of claim 13, further comprising a current sense signal ripple down-slope calculator circuit configured to output a signal corresponding to a downslope of the current sense signal;
wherein the PWM controller is configured for a constant off time mode and further comprises:
a control signal calculator circuit configured to add half the output of the ripple down-slope calculator circuit and the modified error voltage, and output the resulting sum;
a comparator having a non-inverting input configured to receive the current sense signal, an inverting input configured to receive the output of the control signal calculator circuit, and an output configured to output a signal based on a comparison of the non-inverting and inverting inputs;
a one-shot circuit configured generate an output pulse; and
a flip-flop circuit having a non-inverting output configured to generate the PWM signal, an inverting output configured to generate an inverted signal of the non-inverting output, a first input configured to receive an output voltage of the one-shot circuit and set the non-inverting output to a first signal state, and a second input configured to receive the output of the comparator and set the non-inverting output to a second signal state;
wherein the one-shot circuit includes a triggering input configured to receive the output of the inverting output of the flip-flop circuit.

17. The boost converter of claim 13, wherein the PWM controller is configured for a constant ripple mode and further comprises:
a subtractor circuit having a non-inverting input configured to receive the current sense signal and an inverting input configured to receive the modified error voltage during a first time interval, whereas during a second time interval the non-inverting input is configured to receive the modified error voltage and the inverting input is configured to receive the current sense signal;
a comparator having a non-inverting input configured to receive a reference voltage, an inverting input configured to receive an output of the subtractor circuit, and an output configured to output a signal based on a comparison of the non-inverting and inverting inputs of the comparator; and
a toggle flip-flop circuit having a non-inverting output configured to generate the PWM signal, and a dynamic input configured to receive the output of the comparator.

18. The boost converter of claim 13, wherein the PWM signal includes a first signal state during a first time interval and a second signal state, different from the first signal state, during a second time interval, said boost converter further comprising:
a modifying coefficient calculator circuit configured to receive a voltage across the inductor during the first time interval and a voltage across the inductor during the second time interval, and output the modifying coefficient, which modifying coefficient corresponds to a ratio of the sum of the voltages across the inductor during the first time interval plus the second time interval, and the voltage across the inductor during the first time interval.

19. A method of generating a pulse width modulation (PWM) signal for a converter configured to receive a DC input and provide a regulated DC output voltage, the method comprising:
obtaining a current sense signal over a present switching cycle of the converter and a preceding switching cycle of the converter, both based on an inductor current through an inductor of the converter;
determining a voltage representing an average inductor current over the present switching cycle;
obtaining an error voltage based on a difference between a reference voltage and a representation of the regulated DC output voltage;
selectively outputting the error voltage or a modified error voltage, the modified error voltage corresponding to a product of the error voltage and a modifying coefficient, based on an operating mode of the converter, and representing a target average inductor current; and
generating the PWM signal based on a difference between said voltage representing the target average inductor current and said voltage representing the average inductor current over the present switching cycle.

20. The method of claim 19, wherein the PWM signal includes a first state during a first time interval and a second state, different from the first state, during a second time interval, the method further comprising:

generating the modifying coefficient based on a ratio of
the sum of a voltage across the inductor during the first time interval plus a voltage across the inductor during the second time interval, and
the voltage across the inductor during the first time interval.

* * * * *